United States Patent [19]

Merkel et al.

[11] Patent Number: 5,510,235
[45] Date of Patent: Apr. 23, 1996

[54] PHOTOGRAPHIC ELEMENTS COMPRISING 2-PHENYLCARBAMOYL-NAPHTHOL IMAGE-MODIFYING COUPLERS YIELDING DYES RESISTANT TO CRYSTALLIZATION AND REDUCTION

[75] Inventors: Paul B. Merkel; Jerrold N. Poslusny; Daniel L. Kapp; John R. Ross, all of Rochester, N.Y.

[73] Assignee: Eastman Kodak Company, Rochester, N.Y.

[21] Appl. No.: 98,555

[22] Filed: Jul. 28, 1993

[51] Int. Cl.$^6$ .................................................. G03C 7/305
[52] U.S. Cl. ........................... 430/553; 430/544; 430/561; 430/562; 430/958
[58] Field of Search ........................ 430/955, 956, 430/957, 958, 543, 544, 561–563, 549

[56] References Cited

U.S. PATENT DOCUMENTS

| | | | |
|---|---|---|---|
| 3,364,022 | 1/1968 | Barr | 430/957 |
| 3,459,552 | 1/1968 | Yoshida et al. | 96/100 |
| 3,488,193 | 1/1970 | Eynde et al. | 96/55 |
| 4,725,530 | 2/1988 | Kobayashi | 430/505 |
| 4,840,884 | 6/1989 | Mooberry et al. | 430/557 |
| 4,857,442 | 8/1989 | Fujita et al. | 430/553 |
| 4,883,746 | 11/1989 | Shimada et al. | 430/504 |
| 4,957,853 | 9/1990 | Kobayashi et al. | 430/384 |
| 5,114,835 | 5/1992 | Sakanoue | 430/393 |

FOREIGN PATENT DOCUMENTS

| | | |
|---|---|---|
| 676750 | 12/1963 | Canada . |
| 0193389 | 10/1990 | European Pat. Off. . |
| 2454329 | 5/1975 | Germany . |
| 62-247363 | 10/1987 | Japan . |
| 1111342 | 4/1968 | United Kingdom . |

*Primary Examiner*—Lee C. Wright
*Attorney, Agent, or Firm*—Peter C. Cody

[57] ABSTRACT

Photographic elements comprising certain 2-phenylcarbamoyl-1-naphthol couplers exhibit proper hue, a resistance to dye crystallization, and a resistance to leuco cyan dye formation. Such couplers can be utilized for their image-modifying effect and can contribute substantially to the overall dye density of an image.

19 Claims, No Drawings

PHOTOGRAPHIC ELEMENTS COMPRISING 2-PHENYLCARBAMOYL-NAPHTHOL IMAGE-MODIFYING COUPLERS YIELDING DYES RESISTANT TO CRYSTALLIZATION AND REDUCTION

FIELD OF THE INVENTION

This invention relates to photographic elements and to novel two-equivalent 2-phenylcarbamoyl-1-naphthol couplers.

BACKGROUND

Modern photographic materials, particularly color negative films, contain a variety of so-called image modifying couplers including development inhibitor releasing (DIR) couplers, switched or timed inhibitor releasing (DIAR) couplers, bleach accelerator releasing couplers (BARCs) and colored masking couplers. DIR couplers, such as those described in U.S. Pat. No. 3,227,554, and DIAR couplers, such as those described in U.S. Pat. No. 4,248,962, perform such useful functions as gamma or curve shape control, sharpness enhancement, granularity reduction and color correction. BARCs, such as those described in European Patent Application 193,389, facilitate the oxidation of developed silver in bleach solutions. They may also enhance silver developability, thereby affecting gamma. Masking couplers, such as those described in J. Opt. Soc. Am, 40, 171 (1950) and in U.S. Pat. No. 2,428,054, are used to correct for the unwanted absorptions of various imaging dyes.

Modern color negative films often contain both image couplers, which contribute solely to the production of dye, and image-modifying couplers, such as those described above. The image-modifying couplers, in addition to having an image modifier component (e.g. bleach accelerator or development inhibitor), also comprise an image dye parent. In films which comprise both image couplers and image-modifying couplers, much of the ultimate color density exhibited by the film is often derived from the parent of the image-modifying coupler.

Many films today contain large amounts of such image-modifying couplers in the red-sensitive, cyan-dye-containing layers. These image-modifying couplers typically have cyan image dye parents which generate cyan dye upon reaction of the image-modifying couplers with oxidized developer. Because such cyan dye substantially contributes to the total red density in these films, it is important that the dyes generated from the image-modifying couplers have suitable properties. Desirable properties include good hue, good stability, resistance to reduction in seasoned bleaches or in bleaches of low oxidizing strength, and resistance to hue changes on storage at low temperatures.

Resistance to reduction in seasoned bleaches is particularly important because certain cyan dyes are prone to being reduced by ferrous ion complexes (such as ferrous EDTA) and other reducing agents, which are found in seasoned bleach solutions. When reduced, these cyan dyes form leuco cyan dyes (LCD formation). Leuco cyan dyes are colorless and, thus, films containing couplers which are easily converted into leuco cyan dyes exhibit substantial loss (and variability) in color density during processing.

Resistance to hue changes upon storage at low temperatures is also of particular importance. Certain cyan dyes tend to crystallize at low temperatures. This naturally affects the hue of such dyes, and it ultimately leads to inaccurate color and tone reproduction in films which have been stored at low temperatures, and which contain these dyes.

From the above, it can be seen that a need exists for image-modifying couplers which are capable of being used in conjunction with image couplers, and which can contribute substantially to the overall color density of an image. Furthermore, a need exists that the dyes generated from such image-modifying couplers be resistant to reduction in seasoned bleaches and be resistant to crystallization at low temperatures.

Certain of the above needs have been provided by known couplers having a 2-phenylcarbamoyl-1-naphthol structure. However, such couplers do not enable all of the above needs to be met. Image couplers, for instance, are known which yield dyes that are resistant to reduction in seasoned bleaches (U.S. Pat. No. 3,488,193 and U.S. Pat. No. 4,957,853). However, these couplers often crystallize at low temperatures. Furthermore, U.S. Pat. No. 4,957,853 discloses that these couplers should not be combined with photographically useful groups to form image-modifying couplers. Such a combination would impair the photographic properties of a photographic element containing the image-modifying couplers.

Bleach accelerator releasing couplers, development inhibitor releasing couplers (both timed and untimed, switched and unswitched), and masking couplers, having a 2-phenylcarbamoyl-1-naphthol structure, are also known (EP 0193389, Japanese Kokai JP62-247363, U.S. Pat. No. 4,725,530, DE 2,454,329, British Patent 1,111,342, Japanese Kokai JP62-087959, U.S. Pat. No. 3,459,552, and U.S. Pat. No. 4,883,746). Several of these image-modifying couplers, however, provide dyes which crystallize at low temperatures. Several others provide dyes which are prone to reduction in seasoned bleach, or which exhibit improper hue; and still others have insufficient or improper image-modifying effect.

As noted, a need exists to provide for image-modifying couplers which are capable of being used in conjunction with image couplers, and which can contribute substantially to the overall color density of an image. Furthermore, a need exists that such image-modifying couplers be resistant to reduction in seasoned bleaches and be resistant to crystallization at low temperatures.

SUMMARY OF THE INVENTION

In this regard, the present invention solves these problems by providing a photographic element comprising a support bearing (a) at least one silver halide emulsion and (b) at least one cyan dye-forming 2-phenylcarbamoyl-1-naphthol coupler having the structure

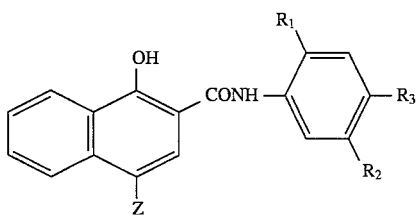

wherein:

$R_1$ is selected from an alkoxy group, a phenoxy group and halogen;

$R_2$ is selected from the group consisting of an alkyl group, a phenyl group, an alkoxy group, a halogen, and an alkoxycarbonyl group; with the provisoes that when $R_2$ is a halogen, $R_1$ is an alkoxy or phenoxy group, and when $R_2$ is an alkoxycarbonyl group, $R_1$ is a phenoxy group;

$R_3$ is selected from hydrogen, and an alkyl group;

$R_1$, $R_2$, and $R_3$ together contain at least 3 carbon atoms; and

Z is a coupling off group selected from a blocked dye moiety and a structure of the formula:

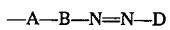

wherein:

A represents a divalent linking group which releases from the coupler upon reaction of the coupler with oxidized developer to cleave Z from the remainder of the coupler;

B is a divalent aromatic group; and

D is an aryl or heteroaryl group.

In one embodiment of the invention, the photographic element comprises a coupler as defined above, but wherein $R_2$ is selected from the group consisting of an alkyl group, a phenyl group, an alkoxy group, and a halogen; with the proviso that when $R_2$ is a halogen, $R_1$ is an alkoxy or a phenoxy group. Preferably, when $R_1$ is an alkoxy group, it is selected from an unbranched, unsubstituted alkoxy group, and a substituted alkoxy group having less than 6 carbon atoms.

In another embodiment, the photographic element comprises a coupler as defined above, but wherein $R_1$, $R_2$, and $R_3$, together contain at least 9 carbon atoms.

In yet another embodiment of the invention, the photographic element is as defined above, and Z is a blocked dye moiety of the formula:

wherein:

L is a linking group; and

E is selected from an azo or azomethine dye.

It is desired that L be selected from

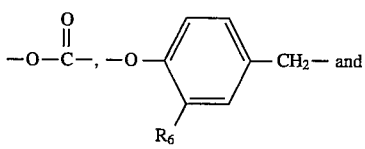

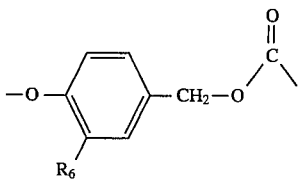

wherein:

$R_6$ is an electron withdrawing group, examples of which include a sulfonamide group, a carbonamide group, a sulfamoyl group, and a nitro group.

The particular selection of substituents on the phenyl group of the 2-phenylcarbamoyl-1-naphthol couplers, as well as the particular placement of the substitutents at ortho and para positions, has been found to impart surprising characteristics to the photographic elements of the invention. Specifically, photographic elements comprising couplers in accordance with the invention exhibit proper hue, a resistance to dye crystallization, and a resistance to leuco cyan dye formation.

DETAILED DESCRIPTION OF THE INVENTION

The present invention concerns couplers having the structure defined below, and photographic elements containing such couplers. Specifically, the invention concerns photographic elements comprising a cyan dye-forming 2-phenylcarbamoyl-1-naphthol image-modifying, or high dye yielding, coupler having the structure I

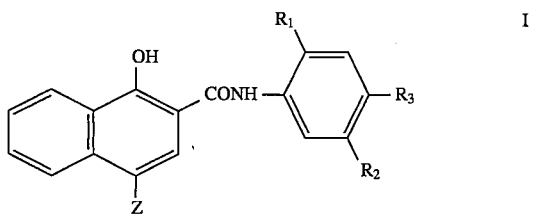

wherein:

$R_1$ is selected from an alkoxy group, a phenoxy group and halogen; and $R_2$ is selected from the group consisting of an alkyl group, a phenyl group, an alkoxy group, a halogen, and an alkoxycarbonyl group; with the provisoes that when $R_2$ is a halogen, $R_1$ is an alkoxy or phenoxy group, and when $R_2$ is an alkoxycarbonyl group, $R_1$ is a phenoxy group. In the preferred embodiments of the invention, $R_2$ is selected from the group consisting of an alkyl group, a phenyl group, an alkoxy group, and a halogen; with the proviso that when $R_2$ is a halogen, $R_1$ is an alkoxy or a phenoxy group. In the above instances, when either $R_1$ or $R_2$ is an alkoxy group, it is preferred that the group be unsubstituted and unbranched.

$R_3$ in the above structure is selected from hydrogen, and an alkyl group; and $R_1$, $R_2$, and $R_3$ together contain at least 3 carbon atoms, preferably at least 9 carbon atoms, and optimally between 12 and 30 carbon atoms.

Other preferred embodiments comprise couplers wherein $R_1$ is an unsubstituted, unbranched alkoxy group, $R_2$ is an unsubstituted alkyl group, and $R_3$ is hydrogen. Within this embodiment, it is even more preferred that $R_1$ be an n-dodecyloxy group and $R_2$ be a methyl group; or that $R_1$ be selected from an n-dodecyloxy group and an n-decyloxy group, and $R_2$ be a secondary butyl group.

Z in the above structure represents a coupling off group selected from a blocked dye moiety and a structure of the formula:

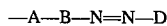

wherein:

A represents a divalent linking group which releases from the coupler upon reaction of the coupler with oxidized developer to cleave Z from the remainder of the coupler;

B is a divalent aromatic group; and

D is an aryl or heteroaryl group.

As used herein, substituents described without reference to branching or substitutions are to be construed as optionally containing branching and/or substitutions.

Also as used herein, alkoxycarbonyl is to be defined as a group having the structure $COOR_5$, wherein $R_5$ is an alkyl group.

As noted, the couplers of the present invention have as a coupling off group, either a blocked dye moiety or a structure of the formula:

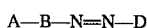

wherein A represents a divalent linking group which releases from the coupler upon reaction of the coupler with oxidized developer to cleave Z from the remainder of the coupler; B is a divalent aromatic group; and D is an aryl or heteroaryl group.

Preferably, A represents a divalent linking group of the formula:

—O—(L1)$_n$—(L2)$_m$— wherein L1 and L2 are divalent linking groups; and n and m are independently either 0 or 1. Ideally, A represents alkylidine groups having 1 to 5 carbon atoms, arylidine groups, —SO$_2$— groups, —C(O)O— groups, —C(O)NR$_8$ groups, —OCH$_2$CH$_2$O— groups, or —O— groups. A also includes —O—, —S—, —NR$_8$—, —NHSO—, —NHSO$_2$—, —OCH$_2$SO$_2$NH—, OCH$_2$CONH—, and —NHCO— groups; wherein R$_8$ is selected from hydrogen or an alkyl group. The bond between A and the coupler is capable of being cleaved upon reaction with oxidized developer.

Preferably, B and D are unsubstituted or substituted aryl or heteroaryl groups, optionally substituted with sulfonate or carboxy groups, or salts thereof. Phenylene is most preferred for B; and naphthyl is most preferred for D.

Specifically, the preferred couplers of the present invention comprise a coupling off group having the structure:

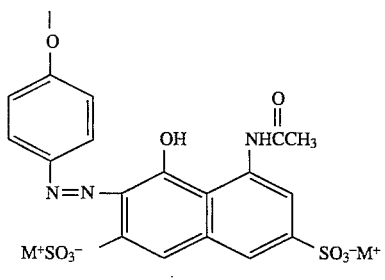

wherein M is a cation. Preferably, M is selected from an alkali metal cation and a protonated amine cation (including pyridine); and more preferably it is selected from K$^+$, Na$^+$ or Cs$^+$, or from pyridinium, ammonium, triethylammonium and tributylammonium ions. Ideally, M is pyridinium.

Other preferred coupling off groups, as noted, are blocked (or shifted) dye moieties as described in U.S. Pat. No. 4,840,884, which is incorporated herein by reference. Such moieties have the formula:

—L—E wherein:

L is a linking group, preferably selected from —OC(O)—,

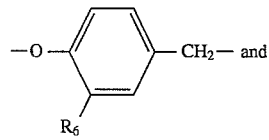

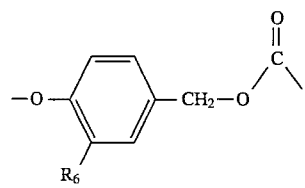

wherein:

R$_6$ is an electron withdrawing group, examples of which include a sulfonamide group, a carbonamide group, a sulfamoyl group, and a nitro group; and E is a dye moiety, preferably selected from an azo or azomethine dye.

The dye moiety (E) is attached to the linking group L in such a way as to convert a blocked form of the dye to an unblocked form upon release of the coupling off group from the coupler. The dye moiety (E) may be attached to the link (L) by a group that is part of the dye chromophore, such as an amino group.

Examples of 2-phenylcarbamoyl-1-naphthol couplers according to this invention include the following:

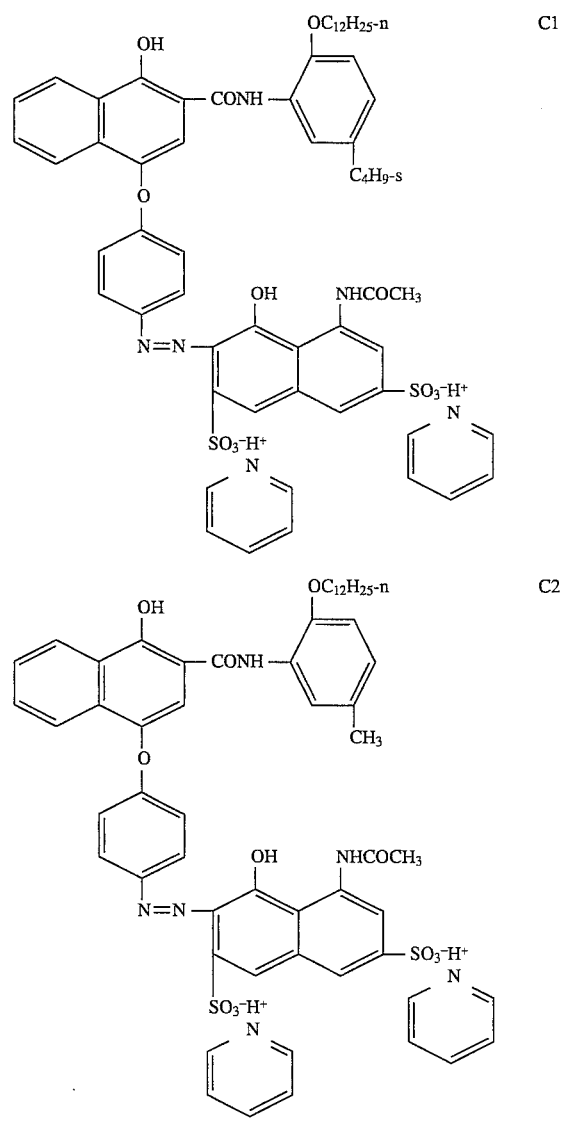

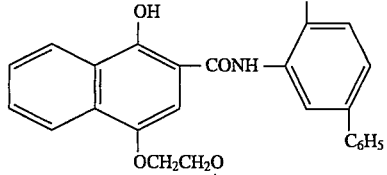
C3
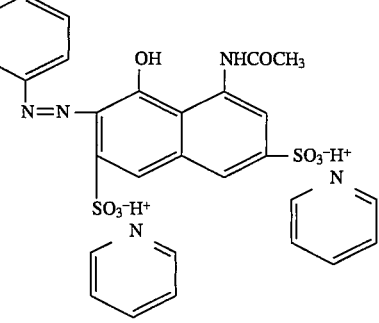
C4
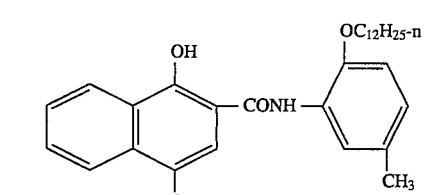
C5
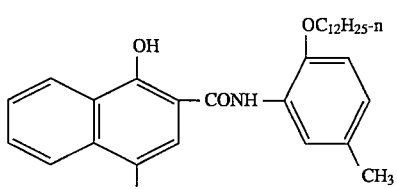
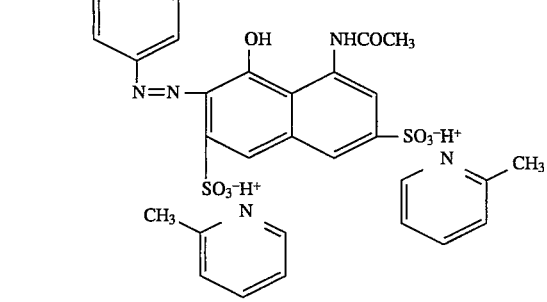
Further examples include those couplers having any one of the following combinations of R substituents (CP), together with any of the subsequent coupling off groups (CO):
| | |
|---|---|
| $R_1 = OC_{12}H_{25}$-n, $R_2 = C_4H_9$-s, $R_3 = H$    CP1 | $R_1 = OC_{12}H_{25}$-n, $R_2 = CH_3$, $R_3 = H$    CP2 |
| $R_1 = OC_{12}H_{25}$-n, $R_2 = CH_3$, $R_3 = CH(CH_3)_2$    CP3 | $R_1 = OC_{12}H_{25}$-n, $R_2 = CH_3$, $R_3 = H$    CP4 |
| $R_1 = OC_{12}H_{25}$-n, $R_2 = C_2H_5$, $R_3 = H$    CP5 | $R_1 = OC_8H_{17}$-n, $R_2 = C_8H_{17}$-t, $R_3 = H$    CP8 |

$R_1 = OC_{10}H_{21}\text{-n}, R_2 = C_6H_5, R_3 = H$    CP9
$R_1 = OC_{10}H_{21}\text{-n}, R_2 = C_4H_9\text{-s}, R_3 = H$    CP10
$R_1 = OCH_3, R_2 = OC_{12}H_{25}\text{-n}, R_3 = H$    CP12
$R_1 = F, R_2 = OC_{12}H_{25}\text{-n}, R_3 = H$    CP13
$R_1 = OCH_2CH_2OCOCH_3, R_2 = C_{15}H_{31}\text{-n}, R_3 = H$    CP15
$R_1 = C_2H_5, R_2 = C_{12}H_{25}\text{-n}, R_3 = H$    CP16
$R_1 = OC_4H_9\text{-n}, R_2 = C_8H_{17}\text{-t}, R_3 = H$    CP17
$R_1 = O(2,4\text{-di-tert-pentylphenyl}), R_2 = CH_3, R_3 = H$    CP18
CO-1
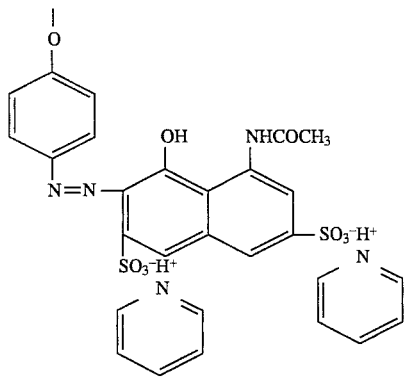
CO-2
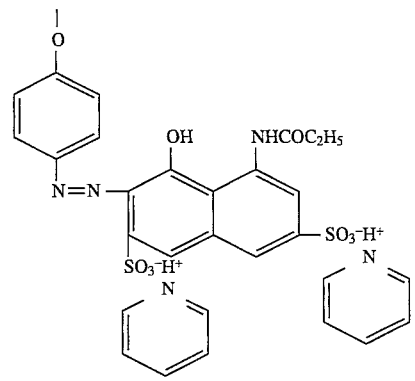
CO-3
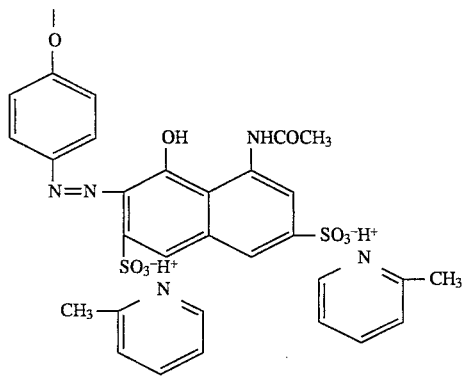
CO-4
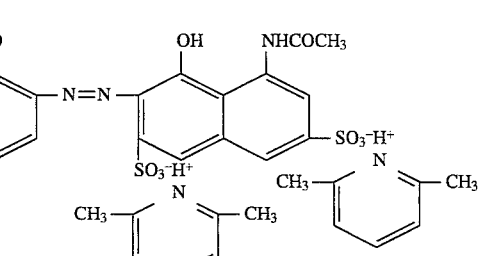
CO-5
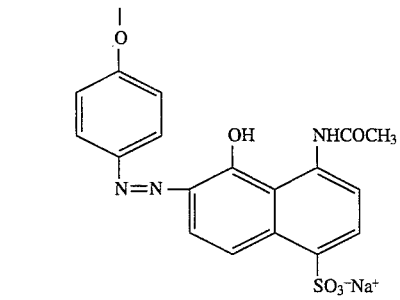
CO-6
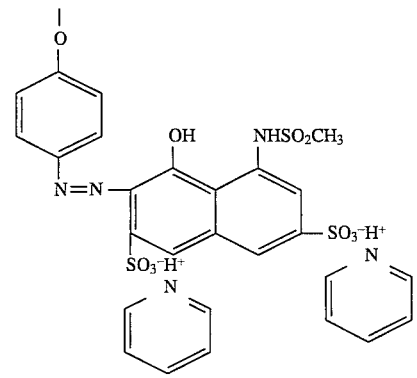
CO-7
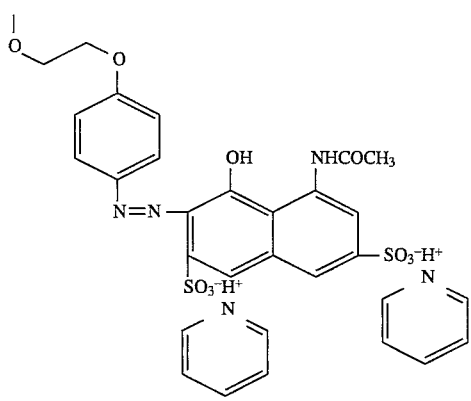
CO-8
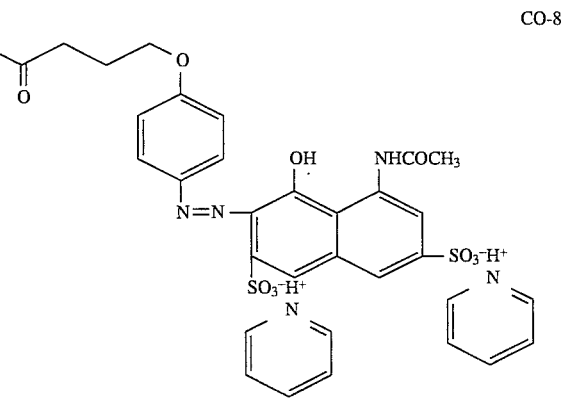

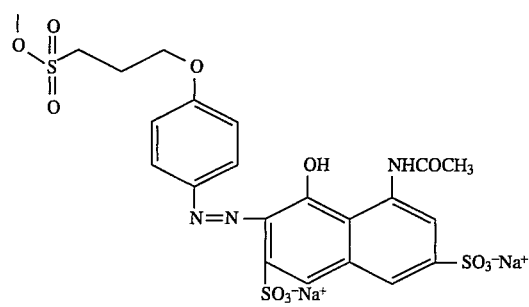
CO-9
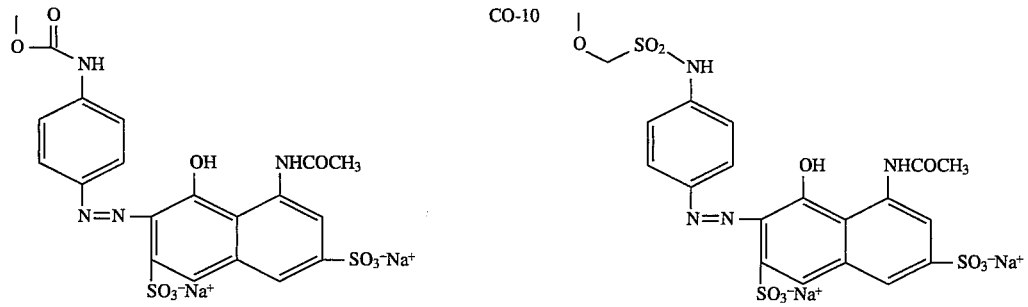
CO-10
CO-11
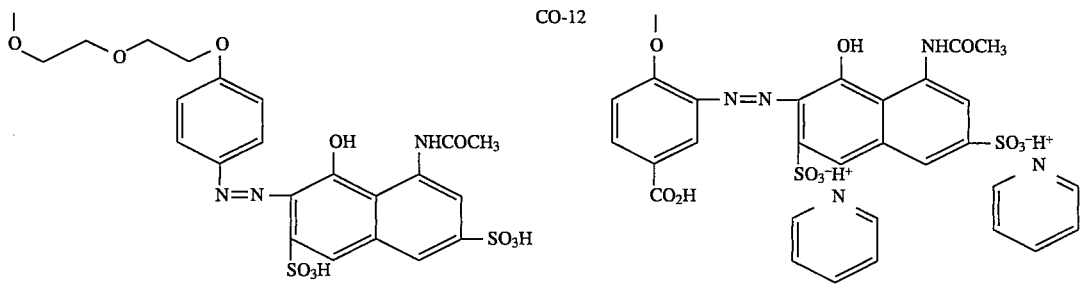
CO-12
CO-13
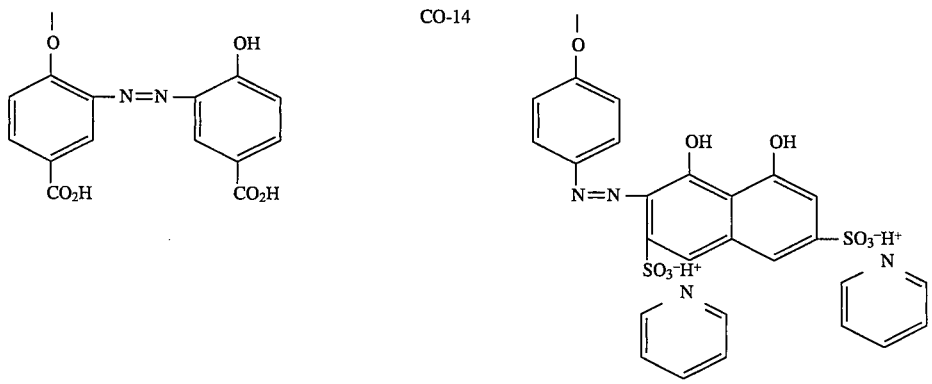
CO-14
CO-15
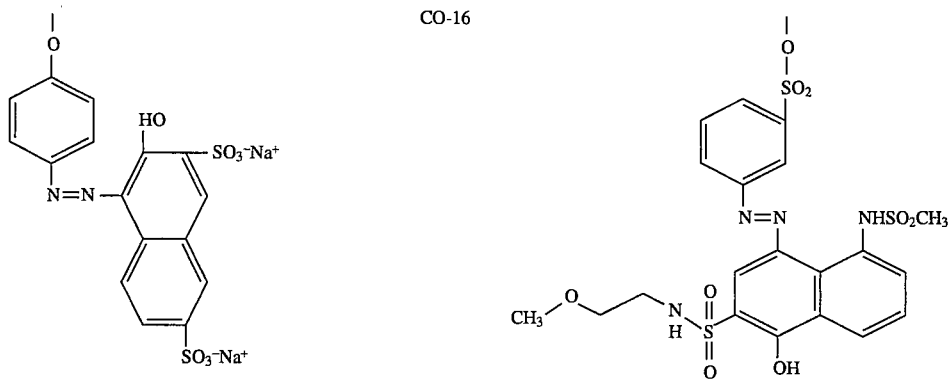
CO-16
CO-17

-continued
CO-18
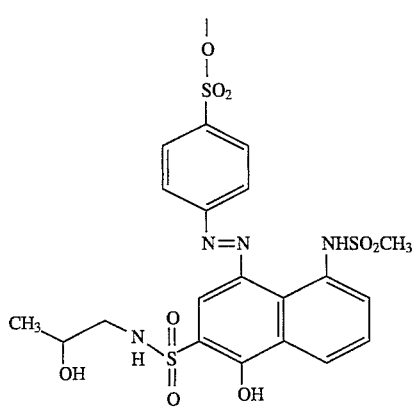
CO-19
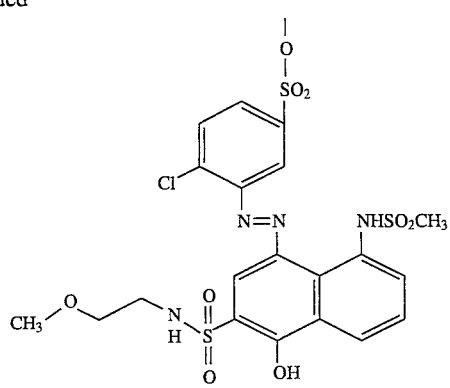
CO-20
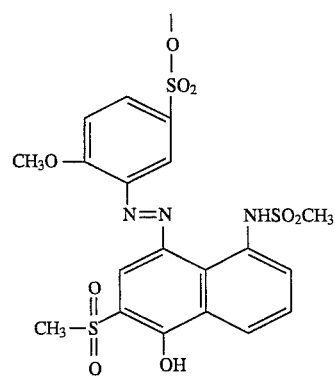
CO-21
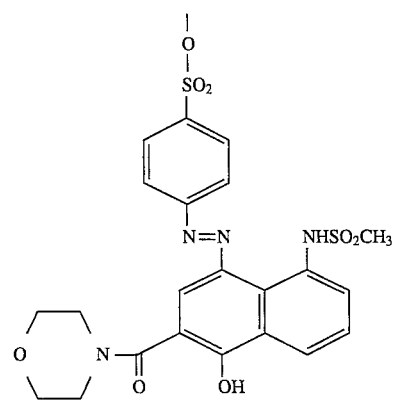
CO-22
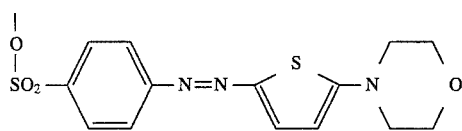
CO-23
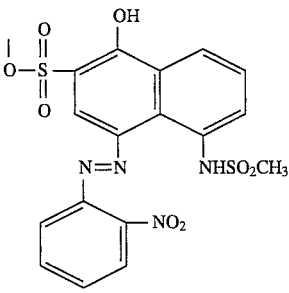
CO-24
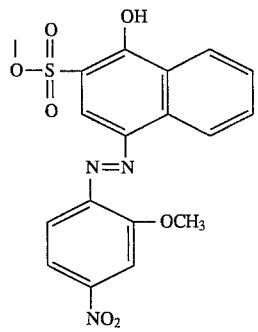
CO-25
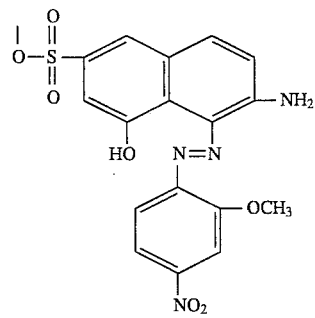

-continued
CO-26
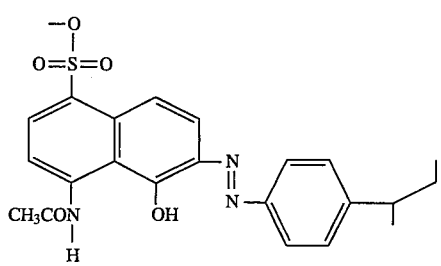
CO-27
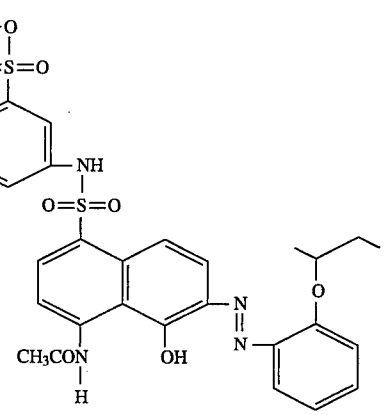
CO-28
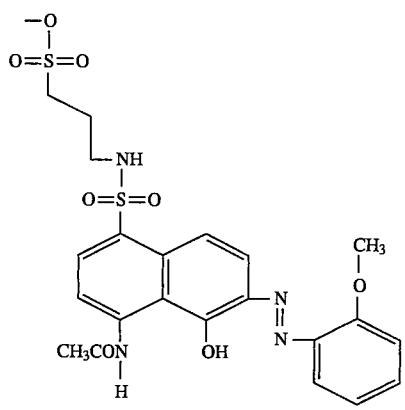
CO-29
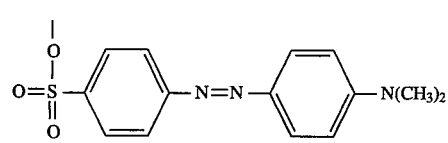
CO-30
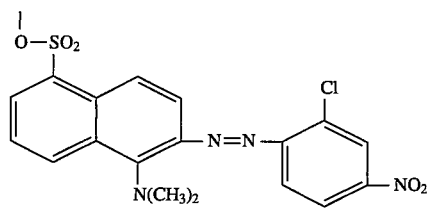
CO-31
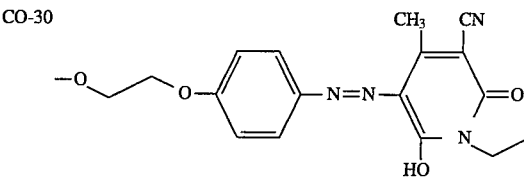
CO-32
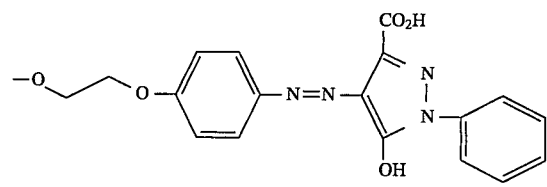
CO-33
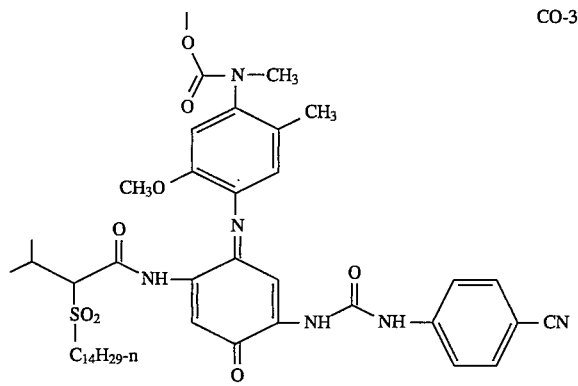
CO-34
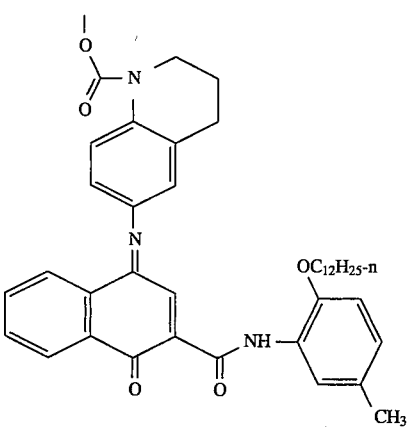

-continued
CO-35 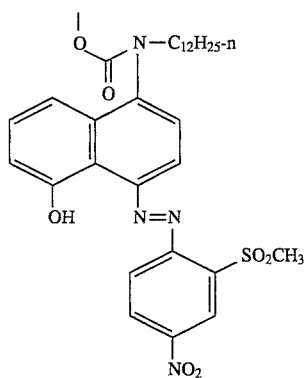
CO-36 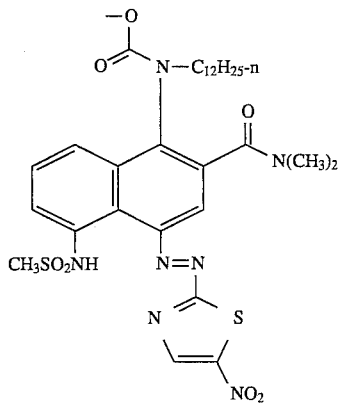
CO-37 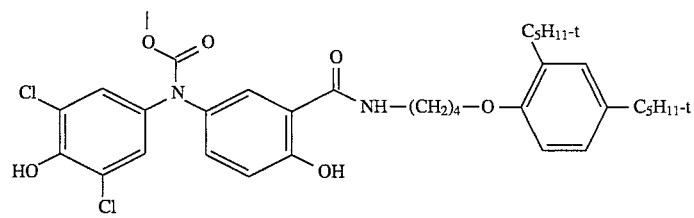
CO-38 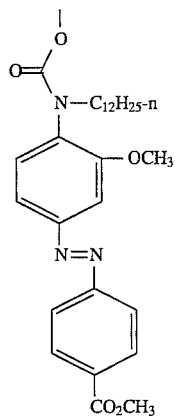
CO-39 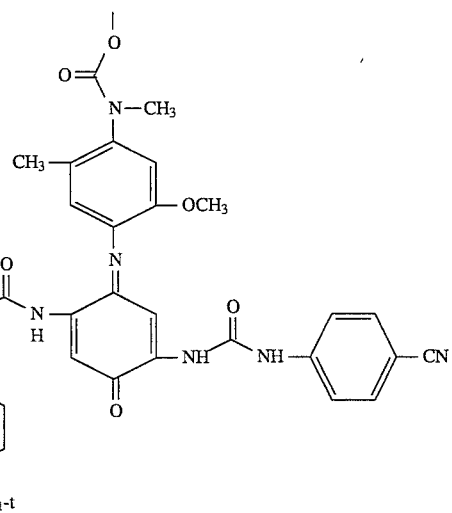

-continued

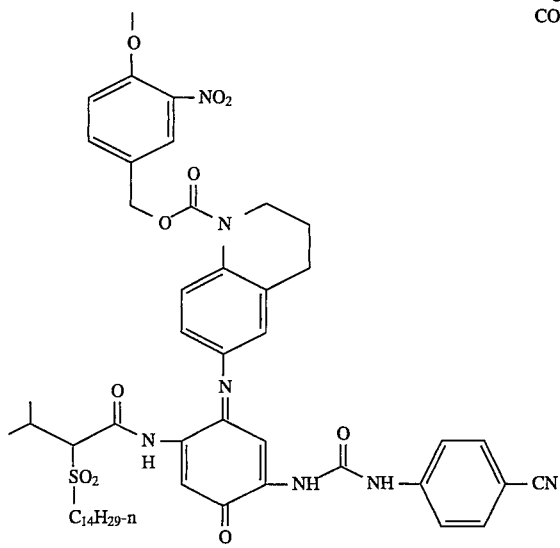
CO-40

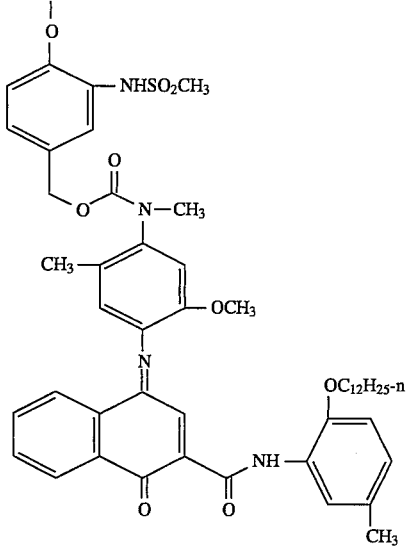
CO-41

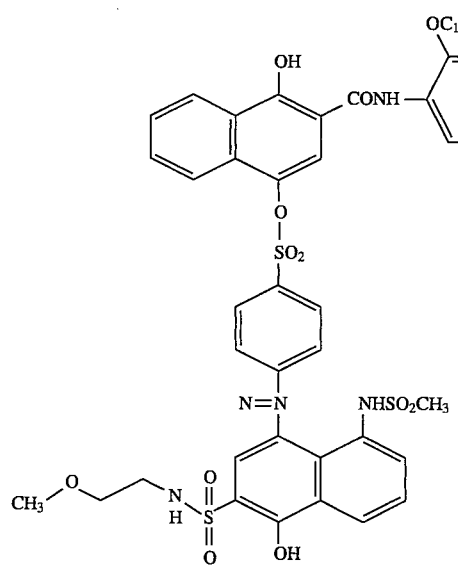
CO-42

The most preferred couplers of the invention are selected from the group consisting of: C1, C2, C5, CP2/CO-4, CP2/CO-17, and CP2/CO-19.

The photographic elements of the present invention can contain broad ranges of the above-described couplers. Preferably, the couplers are present in amounts between about 0.002 and about 0.40 grams per square meter. Ideally, they are present in amounts between about 0.01 and about 0.20 grams per square meter.

The couplers of this invention may be used in combination with yellow or magenta image couplers or image-modifying couplers. It is desired, though, that the 2-phenyl-carbamoyl-1-naphthol couplers of this invention be used with cyan image couplers, including those of structures II, III, IV and V, below:

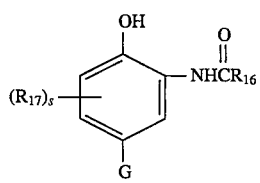
II

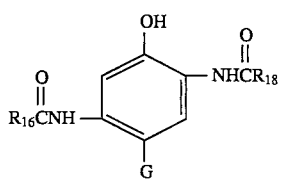
III

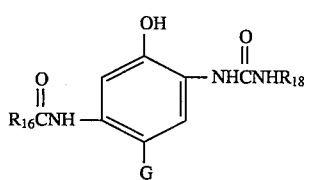
IV

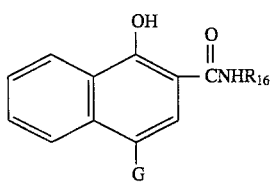

wherein:

s is from 0 to 3;

$R_{16}$ is a ballast group, such as an unsubstituted or a substituted alkyl group with at least 10 carbon atoms or a substituted phenyl group with at least 10 carbon atoms;

each $R_{17}$ is individually selected from halogens, alkyl groups of 1 to 4 carbon atoms and alkoxy groups of 1 to 4 carbon atoms;

$R_{18}$ is selected from unsubstituted or substituted alkyl groups, and unsubstituted or substituted aryl groups, wherein the substituents comprise one or more electron-withdrawing groups or atoms, such as cyano, chloro, fluoro, methylsulfonyl, or trifluoromethyl; and G is hydrogen or a coupling off group that is not photographically useful. Examples of G include chlorine, an alkoxy group, an aryloxy group, a ballasted alkylthio or arylthio group, an acyloxy group, a carbonamido group, a sulfonamido group, and a nitrogen-containing heterocyclic group, such as a pyrazolyl, an imidazolyl; a succinimido or an hydantoinyl group.

Preferred image couplers for use in combination with the 2-phenylcarbamoyl-1-naphthol couplers of this invention are the 2-phenylureido-5-carbonamidophenol cyan dye-forming couplers of structure IV, preferably those in which $R_{18}$ is a p-cyanophenyl group and G is hydrogen or an aryloxy group. Useful weight ratios of the 2-phenylcarbamoyl-1-naphthol couplers of this invention to image coupler are from about 0.005:1.0 to about 2.0:1.0, depending on the layer and the type of 2-phenylcarbamoyl-1-naphthol coupler.

Specific image couplers which may be utilized in the photographic element of the present invention include:

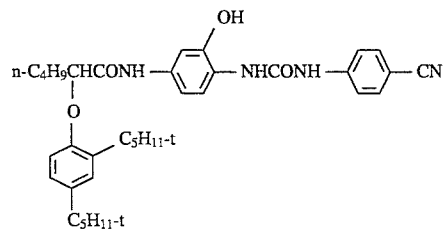

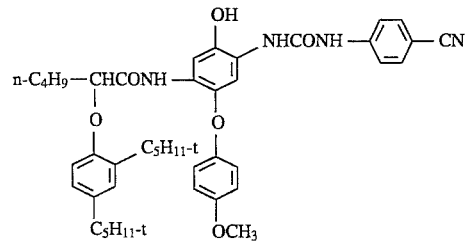

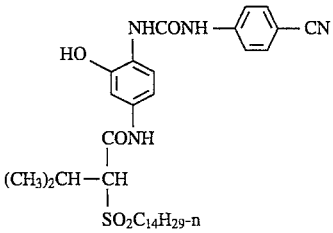

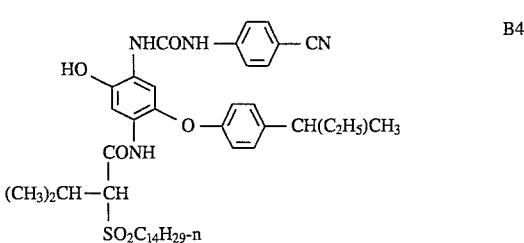

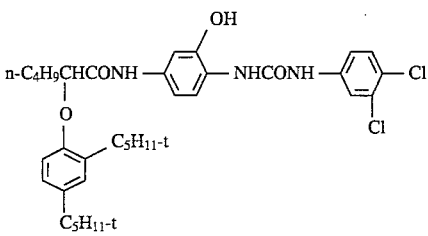

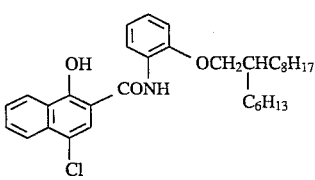

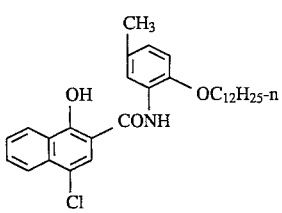

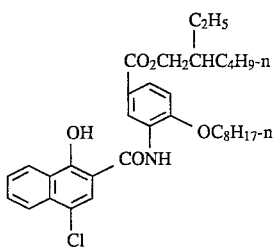

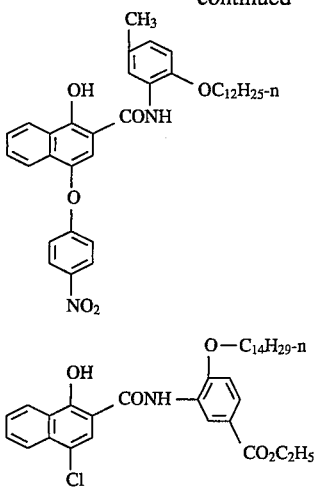

B9

B10

The couplers of this invention can be utilized by dissolving them in high-boiling-temperature coupler solvents and then dispersing the organic coupler plus coupler solvent mixture as small particles in aqueous solutions of gelatin and surfactant (via milling or homogenization). Removable auxiliary organic solvents such as ethyl acetate or cyclohexanone may also be used in the preparation of such dispersions to facilitate the dissolution of the coupler in the organic phase.

Coupler solvents useful for the practice of this invention include aryl phosphates (e.g. tritolyl phosphate), alkyl phosphates (e.g. trioctyl phosphate), mixed aryl alkyl phosphates (e.g. diphenyl 2-ethylhexyl phosphate), aryl, alkyl or mixed aryl alkyl phosphonates, phosphine oxides (e.g. trioctylphosphine oxide), esters of aromatic acids (e.g. dibutyl phthalate), esters of aliphatic acids (e.g. dibutyl sebecate), alcohols (e.g. 2-hexyl-1-decanol), phenols (e.g. p-dodecylphenol), carbonamides (e.g. N,N-dibutyldodecanamide or N-butylacetanalide), sulfoxides (e.g. bis(2-ethylhexyl)sulfoxide), sulfonamides (e.g. N,N-dibutyl-p-toluenesulfonamide) or hydrocarbons (e.g. dodecylbenzene). Additional coupler solvents and auxiliary solvents are noted in Research Disclosure, December 1989, Item 308119, p 993. Useful coupler:coupler solvent weight ratios range from about 1:0.1 to about 1:10, with about 1:0.2 to about 1:5.0 being preferred.

The photographic couplers of the present invention may be employed in photographic materials in a manner well known in the photographic art. For example, a supporting substrate may be coated with a silver halide emulsion comprising a 2-phenylcarbamoyl-1-naphthol coupler of the present invention. The 2-phenylcarbamoyl-1-naphthol couplers may be coated with an image coupler, such as a 2-phenylureido-5-carbonamidophenol image coupler, imagewise exposed, and then developed in a solution containing a primary aromatic amine color developing agent.

The photographic elements of the present invention may be simple elements or multilayer, multicolor elements. Multicolor elements contain dye image-forming units sensitive to each of the three primary regions of the visible light spectrum. Each unit can be comprised of a single emulsion layer or of multiple emulsion layers sensitive to a given region of the spectrum. The layers of the element, including the layers of the image-forming units, can be arranged in various orders as known in the art.

A typical multicolor photographic element comprises a support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like.

The element may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 microns.

In the following discussion of suitable materials for use in the elements of this invention, reference will be made to Research Disclosure, December 1978, Item 17643, and Research Disclosure, December 1989, Item No. 308119, both published by Kenneth Mason Publications, Ltd., Dudley Annex, 12a North Street, Emsworth, Hampshire PO10 7DQ, ENGLAND, the disclosures of which are incorporated herein by reference. These publications will be identified hereafter by the term "Research Disclosure." A reference to a particular section in "Research Disclosure" corresponds to the appropriate section in each of the above-identified Research Disclosures. The elements of the invention can comprise emulsions and addenda described in these publication and publications referenced in these publications.

The silver halide emulsions employed in the elements of this invention can be comprised of silver bromide, silver chloride, silver iodide, silver bromochloride, silver iodochloride, silver iodobromide, silver iodochlorobromide or mixtures thereof. The emulsions can include silver halide grains of any conventional shape or size. Specifically, the emulsions can include coarse, medium or fine silver halide grains. High aspect ratio tabular grain emulsions are specifically contemplated, such as those disclosed by Wilgus et al. U.S. Pat. No. 4,434,226, Daubendiek et al. U.S. Pat. No. 4,414,310, Wey U.S. Pat. No. 4,399,215, Solberg et al. U.S. Pat. No. 4,433,048, Mignot U.S. Pat. No. 4,386,156, Evans et al. U.S. Pat. No. 4,504,570, Maskasky U.S. Pat. No. 4,400,463, Wey et al. U.S. Pat. No. 4,414,306, Maskasky U.S. Pat. Nos. 4,435,501 and 4,643,966 and Daubendiek et al. U.S. Pat. Nos. 4,672,027 and 4,693,964, all of which are incorporated herein by reference. Also specifically contemplated are those silver iodobromide grains with a higher molar proportion of iodide in the core of the grain than in the periphery of the grain, such as those described in British Reference No. 1,027,146; Japanese Reference No. 54/48,521; U.S. Pat. Nos. 4,379,837; 4,444,877; 4,665,012; 4,686,178; 4,565, 778; 4,728,602; 4,668,614 and 4,636,461; and in European Reference No 264,954, all which are incorporated herein by reference. The silver halide emulsions can be either monodisperse or polydisperse as precipitated. The grain size distribution of the emulsions can be controlled by silver halide grain separation techniques or by blending silver halide emulsions of differing grain sizes.

Sensitizing compounds, such as compounds of copper, thallium, lead, bismuth, cadmium and Group VIII noble metals, can be present during precipitation of the silver halide emulsion.

The emulsions can be surface-sensitive emulsions, i.e., emulsions that form latent images primarily on the surface of the silver halide grains; or internal latent image-forming emulsions, i.e., emulsions that form latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent.

The silver halide emulsions can be surface-sensitized, and noble metal (e.g., gold), middle chalcogen (e.g., sulfur, selenium, or tellurium) and reduction sensitizers, employed individually or in combination, are specifically contemplated. Typical chemical sensitizers are listed in Research Disclosure Item 308119, cited above, Section III.

The silver halide emulsions can be spectrally sensitized with dyes from a variety of classes, including the polymethine dye class, which includes the cyanines, merocyanines, complex cyanines and merocyanines (i.e., tri-tetra-, and polynuclear cyanines and merocyanines), oxonols, hemioxonols, stryryls, merostyryls, and streptocyanines. Illustrative spectral sensitizing dyes are disclosed in Research Disclosure, Item 308119, cited above, Section IV.

Suitable vehicles for the emulsion layer and other layers of elements of this invention are described in Research Disclosure, Item 308119, Section IX and the publications cited therein.

Besides the 2-phenylcarbamoyl-1-naphthol couplers described herein, the elements of this invention can include additional couplers as described in Research Disclosure, Section VII, paragraphs D, E, F, and G and the publications cited therein. The additional couplers can be incorporated as described in Research Disclosure, Section VII, paragraph C, and the publications cited therein.

The photographic elements of this invention can contain brighteners (Research Disclosure, Section V), antifoggants and stabilizers (Research Disclosure, Section VI), antistain agents and image dye stabilizers (Research Disclosure, Section VII, paragraphs I and J), light absorbing and scattering materials (Research Disclosure, Section VIII), hardeners (Research Disclosure, Section X), coating aids (Research Disclosure, Section XI), plasticizers and lubricants (Research Disclosure, Section XII), antistatic agents (Research Disclosure, Section XIII), matting agents (Research Disclosure, Section XII and XVI) and development modifiers (Research Disclosure, Section XXI.

The photographic elements can be coated on a variety of supports as described in Research Disclosure, Section XVII and the references described therein.

The photographic elements of the invention can be exposed to actinic radiation, typically in the visible region of the spectrum, to form a latent image as described in Research Disclosure, Section XVIII, and then processed to form a visible dye image as described in Research Disclosure, Section XIX. Processing to form a visible dye image includes the step of contacting the element with a color developing agent to reduce developable silver halide and oxidize the color developing agent. Oxidized color developing agent in turn reacts with the coupler to yield a dye.

Preferred color developing agents are p-phenylenediamines. Especially preferred are 4-amino-3-methyl-N,N-diethylaniline hydrochloride, 4-amino-3-methyl-N-ethyl-N-(β-methanesulfonamidoethyl)-aniline sulfate hydrate, 4-amino-3-methyl-N-ethyl-N-(β-hydroxyethyl)-aniline sulfate, 4-amino-3-β-(methanesulfonamidoethyl)-N,N-diethylaniline hydrochloride, and 4-amino-N-ethyl-N-(β-methoxyethyl)-m-toluidine di-p-toluenesulfonic acid. With negative-working silver halide, the processing step described above provides a negative image. The described elements are preferably processed in the known C-41 color process as described in, for example, the British Journal of Photography Annual, 1988, pages 196–198. To provide a positive (or reversal) image, the color development step can be preceded by development with a non-chromogenic developing agent to develop exposed silver halide, but not from dye, and then uniformly fogging the element to render unexposed silver halide developable. Alternatively, a direct positive emulsion can be employed to obtain a positive image.

Development is followed by the conventional steps of bleaching, fixing, or bleach-fixing, to remove silver or silver halide, washing, and drying.

Preparation of the 2-phenylcarbamoyl-1-naphthol couplers of this invention is illustrated by the following synthetic examples.

Synthesis Example A: Synthesis of an inventive coupler comprising R substituents represented by CP1, and a coupling off group represented by CO-1, is shown schematically below and described in detail in the subsequent paragraphs.

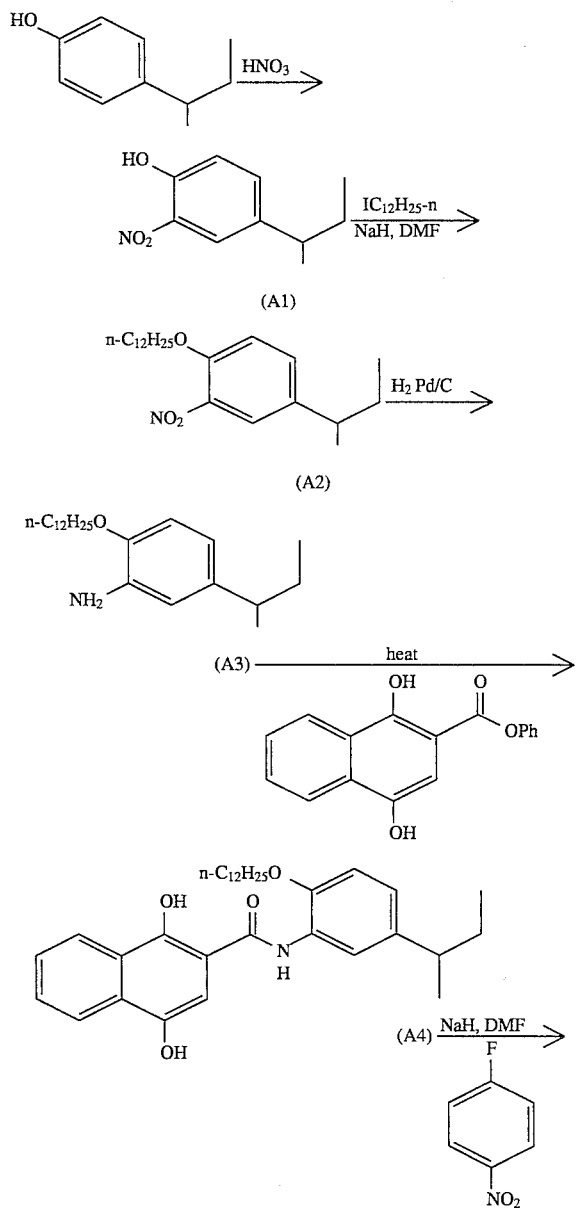

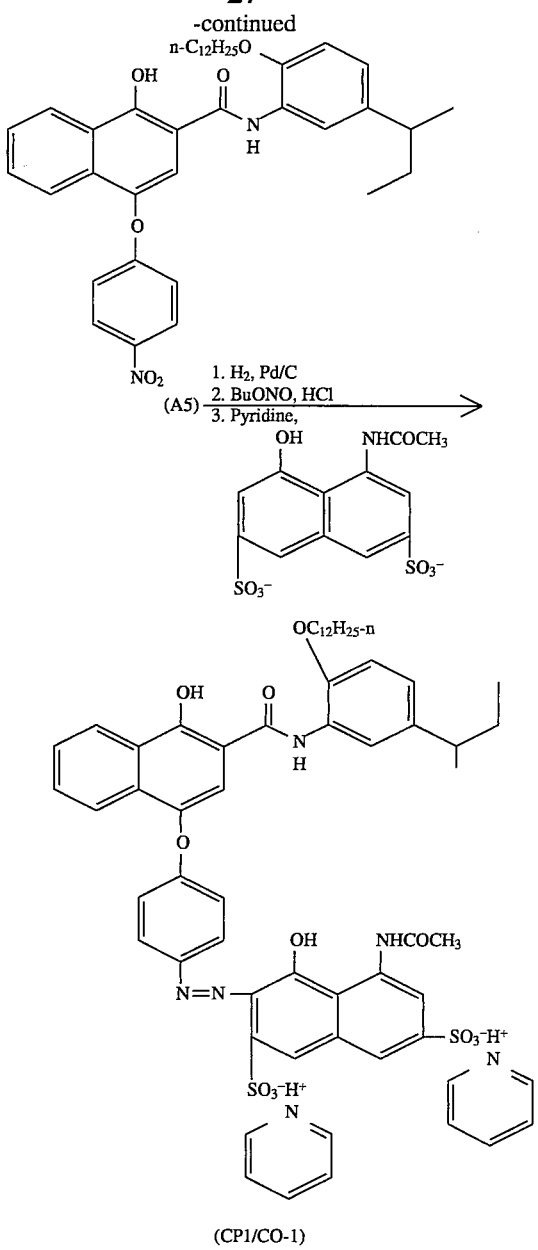

(CP1/CO-1)

Compound (A1): A solution of 100 g (0.67 mol) of 4-sec-butylphenol in 600 mL of glacial acetic acid was cooled to 15° C. on an ice bath. Red fuming nitric acid (53.5 g, 0.85 mol) was then added dropwise at a rate sufficient to keep the reaction temperature under 170° C. Thin layer chromatography of the product showed one major spot. The reaction mixture was poured into 3 L of ice water, and then the aqueous mixture was extracted with 1.5 L of ethyl acetate. The extract was dried over magnesium sulfate, was filtered, and was concentrated on a rotary evaporator. The crude product was dissolved in ligroin and chromatographed on silica gel using ligroin as an eluant. Upon evaporation of the ligroin, 105.0 g of (A1) was obtained as a yellow oil.

Compound (A2): Compound (A1) (105.0 g, 0.54 mol) was added to a solution of 200 mL (0.80 mol) of iodododecane and 500 mL of N,N-dimethylformamide (DMF). The solution was stirred at room temperature, and 22.0 g (0.54 mol) of 60% sodium hydride was slowly added. Then the mixture was heated at 75° C. for four hours. After cooling to ambient temperature, the mixture was poured into a cold solution of dilute hydrochloric acid and then extracted with 1.4 L of ethyl acetate. The extract was dried over magnesium sulfate and filtered. The filtrate was concentrated to provide 100 g of crude product, which was dissolved in ligroin and chromotographed on silica gel using ligroin and then a 95:5 mixture of ligrion:ethyl acetate as the eluants. Upon evaporation of the solvents, 58.0 g of (A2) was obtained as an oil.

Compound (A3): Compound (A2) was dissolved in tetrahydrofuran (THP) and a catalytic amount of 10% palladium on carbon was added. The mixture was shaken under a hydrogen atmosphere (50 psi) overnight. The catalyst was removed by filtration through Celite, and then the solvent was removed under vacuum. This afforded 41.0 g of (A3) as a pale yellow oil.

Compound (A4): An intimate mixture of 28 g of 1,4-dihydroxynaphthalene-2-carboxylic acid phenyl ester and 33.3 g of amine (A3) was placed under vacuum (30–40 Torr) and lowered into a 200° C. oil bath. The mixture became fluid within a minute and was stirred at 200°–210° C. Phenol by-product was distilled from the reaction mixture. After 1 hour the reaction mixture was cooled to room temperature. The resulting brown solid was crystallized from ethyl acetate/acetonitrile (1:4) to provide 35.7 g of (A4) as a tan solid.

Compound (A5): Sodium hydride (4 g, 60%, 100 mmol) was added to a solution of (A4) (20.2 g, 40 mmol) in DMF (100 mL) at 0° C. After stirring at 0° C. for 30 minutes, a solution of 4-fluoro-1-nitrobenzene in 20 mL of DMF was added dropwise over 20 minutes. The resulting solution was stirred at 0° C. for 1 hour. The reaction mixture was then poured into 1000 mL of ice cold 10% HCl with stirring to afford a gummy solid. Chromatographic purification on silica gel with heptane/dichloromethane (1:1) as eluent provided 19 g of (A5) as an off-white solid.

Coupler (CP1/CO-1): Nitro compound (A5) (6.4 g, 10 mmol) was dissolved in methanol/THF/acetic acid (130 mL/50 mL/30 mL) and 10% palladium on carbon (Kodak, 1.2 g) was added. The resulting suspension was shaken under an atmosphere of hydrogen (50 psi pressure) for 2 hours. The mixture was filtered to remove the palladium catalyst and 1.32 mL of concentrated HCl was added. The solution was cooled to 0° C. and butyl nitrite (Aldrich, 1.23 mL, 10.1 mmol) was added. After stirring at 0° C. for 40 minutes, the resulting orange diazonium solution was added, over 20 minutes, to a solution of 8-acetamido-1-naphthol-3,7-disulfonic acid bis pyridinium salt (5.2 g, 10 mmol) in pyridine/methanol (10 mL/30 mL) also at 0° C. The resulting purple solution was allowed to warm to room temperature. After 1.5 hours the solvent volume was reduced to 50 mL and the purple oil was crystallized from acetone to afford 8.05 g of masking coupler (CP1/CO-1) as a purple powder.

Synthesis Example D: Synthesis of an inventive coupler comprising R substituents represented by CP2, and a coupling off group represented by CO-17, is shown schematically below and described in detail in the subsequent paragraphs.

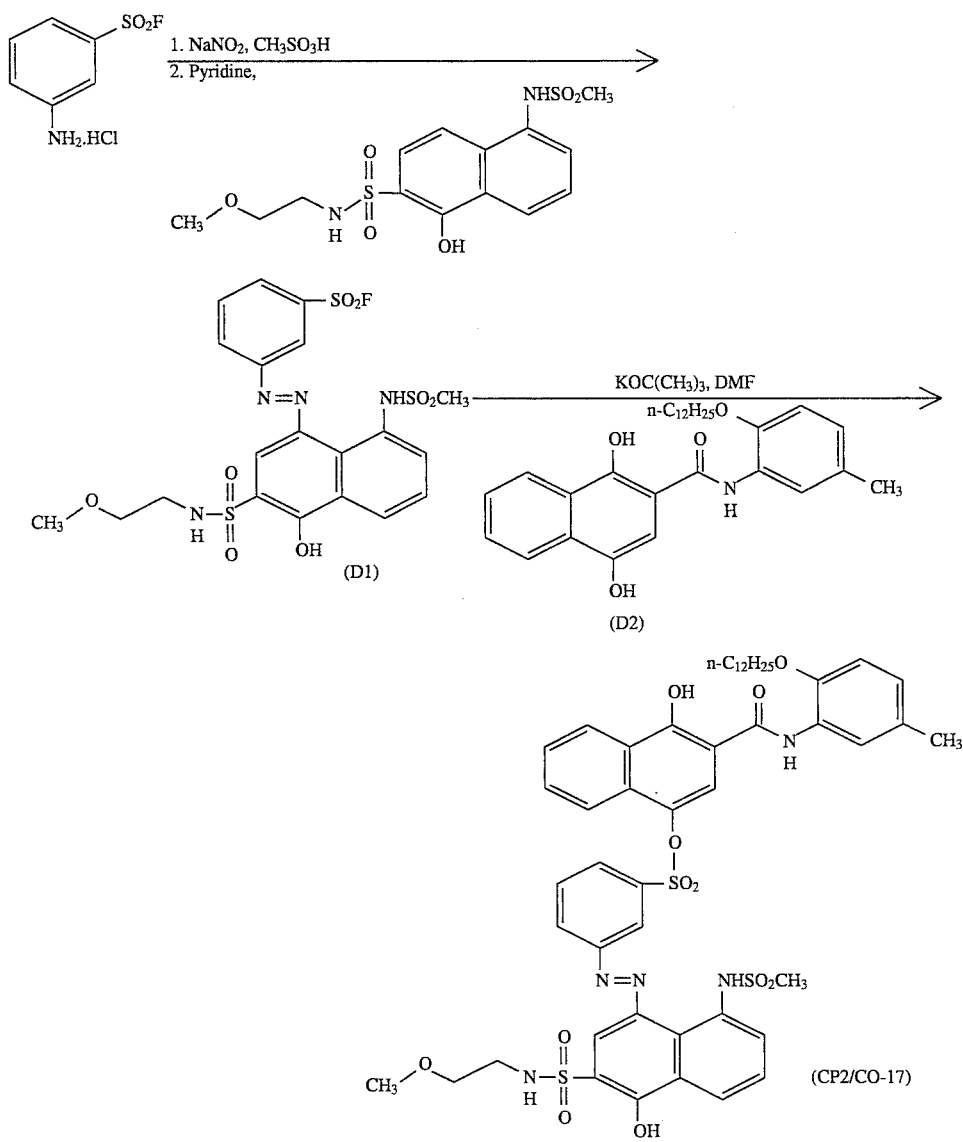

Compound (D1) : A solution of 3-aminobenzenesulfonyl fluoride hydrochloride (11.39 g, 54 mmol) in acetic acid/propanoic acid/methansulfonic acid (100 mL/20 mL/14 mL) was cooled to 0° C. and a solution of sodium nitrite (3.79 g, 55 mmol) in water (15 mL) was added. The solution was stirred for 40 minutes at 0° C. and was then added over 30 minutes to a solution of 2( 2-methoxyethylsulfamoyl)-5-methanesulfonamido-1-naphthol (17 g, 45 mmol) in pyridine (150 mL). The red solution was stirred at 0° C. for 3 hours and then poured into 2 L of ice cold 10% HCl with stirring. The resulting precipitate was isolated by filtration and dried in air to yield 85 g of red solid. The solid was triturated with 400 mL of boiling ethanol for 10 minutes, was allowed to cool to 30° C. with good stirring, and was filtered to afford 24.1 g of compound (D1) as a brick red powder.

Coupler (CP2/CO-17): Potassium tert-butoxide (11.2 g, 100 mmol) in 25 mL of DMF, was added to a 0° C. solution of (D1) (22.2 g, 20 mmol) and (D2) (9.54 g, 20 mmol) in DMF (100 mL) over 15 minutes. The purple solution was warmed to room temperature. After 1.5 hours the solution was diluted with ethyl acetate (600 mL) and washed with 10% HCl (2×200 mL). The organic phase was washed with saturated sodium bicarbonate solution (100 mL) and was evaporated to provide 25 g of a purple oil. The oil was crystallized from acetic acid to yield 8.4 g of masking coupler (CP2/CO-17) as a red solid.

Compound (D1) was made by a method analogous to that described previously for the synthesis of compound (A5).

EXAMPLES

In the following examples, coupler solvent S1 refers to tritolyl phosphate (mixed isomers), coupler solvent S2 is dibutyl phthalate, coupler solvent S3 is 1,4-cyclohexylene-dimethylene bis(2-ethylhexanoate), coupler solvent S4 is N,N-diethyldodecanamide, coupler solvent S5 is N-butylacetanilide and coupler solvent S6 is N,N-dibutyldodecanamide.

Example 1

Illustration of the Advantageous Properties of the of this Invention in a Simplified Test Format.

In order to rapidly evaluate the 2-phenylcarbamoyl-1-naphthol couplers of this invention, simple testing procedures were developed for initial comparisons. For these tests, each coupler or, in some cases, a four-equivalent parent coupler was coated on a transparent acetate support as a single layer in a gelatin binder. The hardened films were then immersed in a solution containing 4-amino-3-methyl-N-ethyl-N-(β-hydroxyethyl)-aniline sulfate (the developer used in the C-41 process) and potassium ferricyanide buffered at a pH of 10. The ferricyanide oxidized the developer, which then reacted with the coupler to form dye. The dye absorption spectrum was then measured on a spectrophotometer. Samples were stored at low temperatures and spectra were remeasured to determine the extent of dye crystallization. The extent of reduction to leuco cyan dye (LCD formation) in a simulated seasoned bleach was also determined for the film samples using the procedures described below. In certain cases, the testing procedures were carried out on coatings of the corresponding four-equivalent parent coupler.

The specific dispersion preparation and coating procedures used for the inventive couplers are illustrated below.

An oil phase consisting of 0.10 g of coupler, 0.20 g of S2, and 0.60 g of S5 and 0.10 g of 4-(1-butylpentyl)pyridine was dispersed in an aqueous phase containing 20.2 mL of water, 1.0 g of gelatin and 0.10 g of the sodium salt of triisopropylnaphthalenesulfonic acid (a dispersing agent) by passing the mixture through a colloid mill in a manner known in the art. Formaldehyde was then added to the dispersion, which was then coated on a cellulose acetate support. The aim coupler laydown was 0.44 g/sq m and the aim gelatin laydown was 4.5 g/sq m.

To convert the couplers to dye, the hardened films were immersed for two minutes in a pH=10 borate buffer solution containing 2.0 g/L of 4-amino-3-methyl-N-ethyl-N-(β-hydroxyethyl)-aniline sulfate, 0.25 g/L of sodium sulfate, and 12.0 g/L of potassium ferricyanide. This simulated the chromogenic development in photographic materials. The dye-containing films were then immersed in a 2% acetic acid solution for one minute and then washed for five minutes at 27° C. After the films were dry, the spectra were measured. The spectral absorption maxima (lambda max values) are reported in the tables below. Most film samples had a density of approximately 1.5 at the absorption maximum near 700 nm.

To evaluate the propensity for dye crystallization on cold storage, samples were placed in a freezer at −18° C. for 48 hr. The absorption spectra were then remeasured on a spectrophotometer. The density loss percentages at the absorption maxima due to dye crystallization are listed in the tables below.

To probe the propensity for reduction of cyan dye to the leuco form in seasoned bleaches (LCD formation), or in bleaches of weak oxidizing strength, a test was designed to simulate the bleaching step of a photographic process, such as the C-41 process. After recording the absorption spectra, the dye-containing films were placed for three minutes in a solution consisting of 50 mL of water, 50 mL of fresh Bleach II used in the C-41 process; 2.0 g of ferrous sulfate heptahydrate, 2.5 g of the dipotassium salt of (ethylenedinitrilo)-tetraacetic acid (EDTA) and 1.5 mL of ammonium hydroxide reagent. The pH of the solution was adjusted to 4.75 with acetic acid prior to immersion of the film samples. This procedure simulated the early stages of the C-41 bleach process, in which ferrous ion concentrations are quite high due to reduction of iron EDTA upon oxidation of developed silver. The films samples were then placed for four minutes in a solution consisting of 100 mL of fresh C-41 Bleach II, 1.0 g/L of ferrous sulfate heptahydrate and 0.2 g/L of dipotassium EDTA adjusted to a pH of 4.75. This simulated the ferrous ion levels and acidity of seasoned bleaches actually observed in seasoned processing solutions encountered in trade laboratories. The films were then washed and dried, and their spectra were remeasured. The percentage losses in density at lambda max due to leuco cyan dye formation are also listed in the tables below. Initial densities were approximately 1.5.

Test data for example 2-phenylcarbamoyl-1-naphthol couplers of this invention and for a comparative coupler is provided in Table IA.

The masking couplers in Table IA were dispersed and coated with coupler solvents S2, S5 and 4-(1-butylpentyl)pyridine (BPP) at 1:2:6:1 coupler: S2:S5:BPP by weight. The structure of the comparative couplers E1 and E2 is given below.

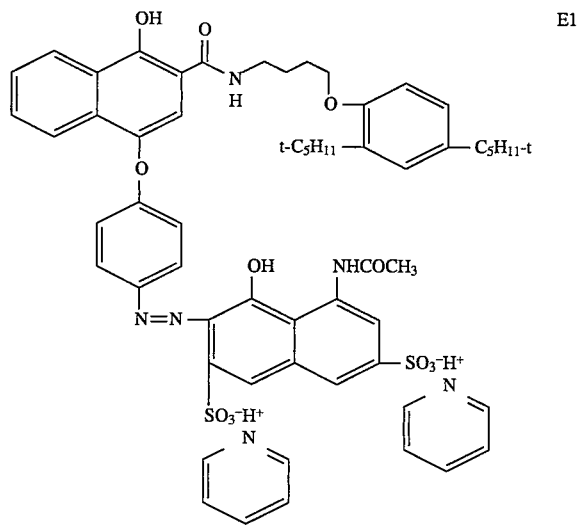

-continued

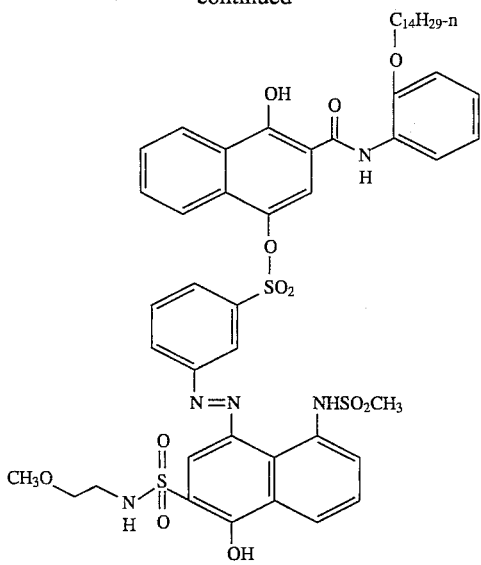

E2

TABLE IA

| Coupler | Lambda Max (nm)[1] | Density Loss % at Lambda Max 48 hr @ −18° C.[2] | Density Loss % in Simulated Seasoned Bleach[3] (LCD Test) |
|---|---|---|---|
| E1 | 690 | 1.8 | 24.1 |
| C1 | 696 | 2.7 | 2.9 |

[1]Spectral absorbtion maxima
[2]Density loss percentages at the absorption maxima due to dye crystallization
[3]Density loss percentages at the absorption maxima due to leuco cyan dye formation From the data in Table IA, it is evident that the comparative coupler (E1) yields a dye which undergoes a large loss in red density (24.1 percent) in a simulated seasoned bleach due to leuco cyan dye formation. The inventive 2-phenyl-carbamoyl-1-naphthol coupler C1, by contrast, yields a dye that shows little loss in red density in the LCD test. Further, such coupler yields a dye which exhibits little density loss due to crystallization upon cold storage.

The inventive coupler also yields a dye having a lambda value near 700 nm. This is significant because couplers which yield dyes with lambda max values significantly above or below 700 nm are less desirable for optimum printing characteristics in color negative materials because a typical color paper onto which a negative is printed has a maximum sensitivity in the region of about 700 nm. Dyes that have an absorption maximum between about 703 nm and 709 nm, though effective, do not modulate light as efficiently in the region of maximum paper sensitivity as dyes which have absorption maxima closer to 700 nm. Dyes that have an absorption maximum above about 709 nm are particularly inefficient and are thus less preferred. that have an absorption maximum above about 709 nm are particularly inefficient and are thus less preferred.

Table IB provides comparative data for a variety of types of four-equivalent 2-phenylcarbamoyl-1-naphthol couplers to illustrate the shortcomings of dyes derived from parent structures that are outside the scope of the claimed invention. Only coupler F8 has the substituents, and locations thereof, to place it (with a coupling off group according to the invention) and the dye it yields within the scope of invention; and only F-8 yields a dye with proper hue, and suitable resistance to crystallization and leuco dye formation. The structures of couplers F1 through F14 are given below.

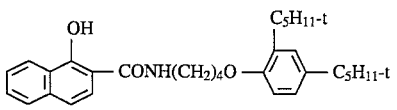
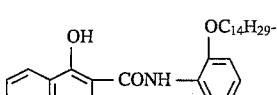
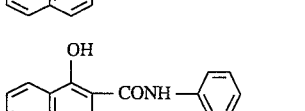
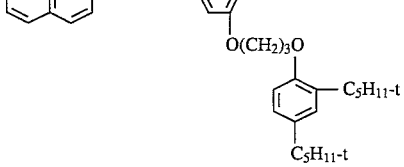
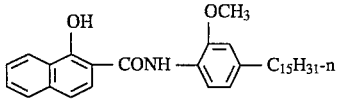
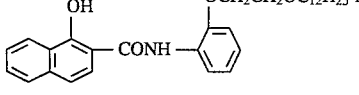
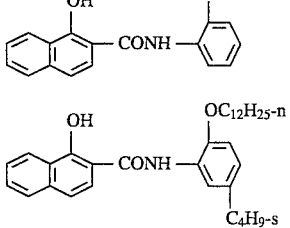
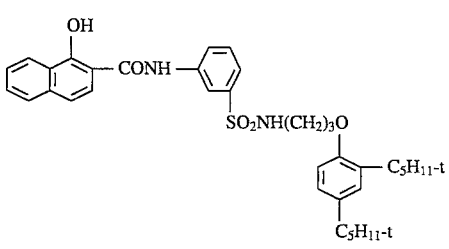
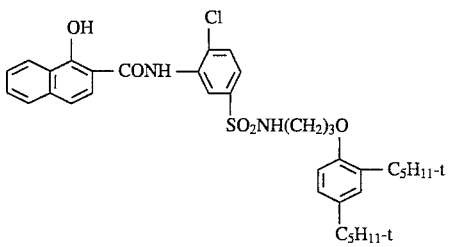

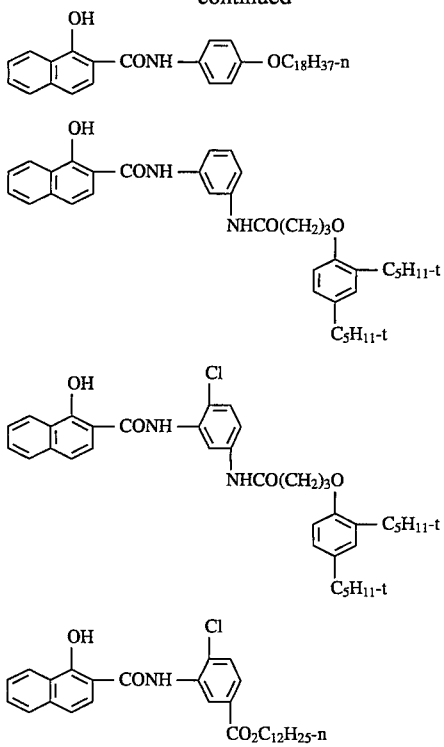

-continued

TABLE IB

| Coupler | Coupler Solvent | Weight Ratio[1] | Lambda Max (nm)[2] | Density Loss % at Lambda Max 48 hr @ -18° C.[3] | Density Loss % in Simulated Seasoned Bleach[4] (LCD Test) |
|---|---|---|---|---|---|
| 1 F1 | S1 | 1:2 | 693 | 0.0 | 17.2 |
| 2 F2 | S1 | 1:2 | 700 | 81.4 | 5.3* |
| 3 F3 | S1 | 1:2 | 694 | 1.2 | 15.7 |
| 4 F4 | S1 | 1:2 | 710 | 0.3 | 6.0 |
| 5 F5 | S1 | 1:2 | 700 | 16.4 | 2.6 |
| 6 F6 | S2 | 1:2 | 698 | 82.1 | 2.2 |
| 7 F7 | S1 | 1:2 | 702 | 54.6 | 1.6 |
| 8 F8 | S1 | 1:2 | 701 | 0.0 | 1.4 |
| 9 F8 | S2 | 1:2 | 698 | 0.0 | 2.3 |
| 10 F8 | S6 | 1:4 | 697 | 0.0 | 3.1 |
| 11 F9 | S1 | 1:2 | 720 | 0.0 | 7.4 |
| 12 F10 | S1 | 1:2 | 724 | 28.9 | 1.3 |
| 13 F11 | S6 | 1:4 | 704 | 54.2 | 10.9 |
| 14 F12 | S1 | 1:2 | 710 | 1.1 | 7.6 |
| 15 F13 | S1 | 1:2 | 711 | 0.1 | 1.1 |
| 16 F14 | S1 | 1:2 | 715 | 0.8 | 0.8 |

[1]Coupler to coupler solvent weight ratio
[2]Spectral absorbtion maxima
[3]Density loss percentages at the absorption maxima due to dye crystallization
[4]Density loss percentages at the absorption maxima due to leuco cyan dye formation
*Dye crystallization during the LCD test procedure contributes to the red density losses for this film.

According to the data in Table IB couplers F2, F5, F6, F7, F10 and F11 all yield dyes that show substantial density losses at lambda max due to dye crystallization on cold storage. Couplers F1, F3, F4 F9, F11 and F12 all yield dyes that show substantial (greater than 5%) density losses at lambda max in the simulated seasoned bleach LCD test. Couplers F4, F9, F10, F12, and F13 also yield dyes with hues that are too bathochromic (lambda max greater than 709 nm) in S1. Only coupler F8, which is a four-equivalent analog (absent a coupling off group) of the couplers of this invention, yields a dye that has the proper hue (701 nm in S1), and that is resistant to crystallization on cold storage and to reduction in a seasoned bleach.

Comparisons of coupler F9 to F10 and of coupler F12 to F13 illustrate that the addition of an ortho substituent in the phenyl ring can reduce the loss in red density in a seasoned bleach due to leuco dye formation. The couplers of this invention contain suitable ortho substituents on the phenyl ring.

Example 2

Evaluation of the 2-Phenylcarbamoyl- 1-Naphthol Couplers of this Invention in a Photographic Element.

The respective comparative and inventive masking couplers E1 and (CP1/CO-1) were dissolved at 13% by weight in warm solutions of 2% 2-ethoxyethanol in water. These solutions were added to the coating melts in amounts sufficient to yield coupler laydowns of 0.43 mmole/m$^2$. The coating format was as follows:

2.69 g/m$^2$ Gelatin (Overcoat)
0.129 g/m$^2$ Bis(vinylsulfonylmethyl) Ether Hardener
3.77 g/m$^2$ Gelatin
0.43 mmol/m$^2$ Masking Coupler
0.5 Micrometer Tabular Grain Silver Iodobromide Emulsion (6% I) (Silver Laydown of 0.646 g/m$^2$)
Cellulose Acetate Butyrate Support No coupler solvent was required for coating these masking couplers. After hardening, the films were exposed through a step tablet on a 1B sensitometer and then subjected to a KODAK FLEXICOLOR™ C-41 process as described in more detail below. To evaluate the propensity for leuco cyan dye formation (i.e. dye bleaching) in a seasoned bleach, exposed 35 mm film strips were slit in half and both halves were processed at the same time in C-41 developer. Both halves were then placed in a stop bath to eliminate any variability due to continued coupling. Then one half was processed in fresh C-41 Bleach II and the other half was processed in a simulated seasoned bleach (Bleach B). Bleach B consisted of fresh Bleach II to which was added 10.0 g/L of ferrous sulfate heptahydrate and 2.0 g/L of dipotassium EDTA dihydrate with the bleach pH adjusted to 4.75. During processing in Bleach B, agitation was provided by nitrogen bubbling (as opposed to air bubbling for Bleach II) to minimize air oxidation of ferrous ion to ferric ion. Status M red densities (Dr) were measured vs exposure for the samples processed in fresh Bleach II and in simulated seasoned Bleach B. Status M red densities (Dr) were also measured for a set of processed film samples before and after cold storage for 48 hr at −18° C. Density losses are reported at an initial density of 1.0. Absorption spectra were also measured for the processed films at a status M red density of about 1.2 on a spectrophotometer.

| C-41 PROCESSING SOLUTIONS AND CONDITIONS | | |
|---|---|---|
| Solution | Processing Time | Agitation Gas |
| C-41 Developer | 3' 15" | Nitrogen |
| Stop Bath | 30" | Nitrogen |
| A) Fresh Bleach II | 3' | Air |
| or B) Seasoned Bleach B | 3' | Nitrogen |
| Wash | 1' | None |
| C-41 Fix | 4' | Nitrogen |
| Wash | 4' | None |
| PHOTO-FLO ® | 30" | None |

C-41 PROCESSING SOLUTIONS AND CONDITIONS

| Solution | Processing Time | Agitation Gas |
|---|---|---|
| Processing Temperature | | 100° F. |

Table II lists red density losses after cold storage for 48 hr at −18° C. for samples processed with fresh Bleach II. Table II also lists red density differences for samples processed in fresh Bleach II versus seasoned Bleach B. While neither coupler yields a dye that experiences significant density loss on cold storage, the dye derived from comparative coupler E1 yields an unacceptably large loss in red density in the simulated seasoned bleach. The masking coupler of this invention CP1/CO-1 yields a dye that shows only a small loss in red density in the seasoned bleach.

TABLE II

| Film | Masking Coupler | % Density Loss (Status M) in 48 hr @ −18° C.[1] | Dr (Bleach B) − Dr (Bleach II) at Dr = 1.0*[2] |
|---|---|---|---|
| Comparison | E1 | 0.0 | −0.19 |
| Invention | CP1/CO-1 | 0.0 | −0.03 |

[1]Red density loss percentages due to dye crystallization.
[2]Red density loss due to the leuco cyan dye formation.
*Difference represents averages of two runs.

Example 3

Evaluation of Sulfonate-Linked 2-Phenylcarbamoyl-1-Naphthol Masking Couplers.

Sulfonate linked masking couplers CP2/CO-17, CP1/CO-17, and CP2/CO-19 of this invention and the comparative sulfonate masking coupler E2 were coated with silver halide (0.91 g Ag/sq m) in gelatin on cellulose acetate butyrate support. The couplers were dispersed and coated with the high-boiling coupler solvent diethyldodecanamide (S4) and the auxiliary solvent ethyl acetate at a 1:2:1.5 coupler: coupler solvent:ethyl acetate weight ratio. The laydowns were 0.22 g/sq m for E2 and CP2/CO-17 and 0.23 g/sg m for CP1/CO-17 and CP2/CO-19.

Samples of each coating were placed in a solution containing oxidized 4-amino-3-methyl-N-ethyl-N-(β-hydroxyethyl)-aniline to convert coupler to dye, as described in Example 1. The visible absorption spectrum was then measured for each film and the samples were placed in a freezer at −18° C. for 48 hours. The samples were then removed, and the spectra remeasured. The absorption maxima (lambda max values) and the percent density losses at lambda max after freezing are reported in Table III. As is apparent from the data in Table III, the couplers of this invention showed no density losses on cold storage, whereas the comparative coupler (E2) showed an undesirable density loss of 12.7%.

TABLE III

| Coupler | Lambda Max (nm) | % Density Loss at Lambda Max 48 hr @ −18° C. |
|---|---|---|
| Comparison: E2 | 699 | 12.7 |
| Invention: | | |
| CP2/CO-17 | 699 | 0.0 |
| CP1/CO-17 | 698 | 0.0 |
| CP2/CO-19 | 697 | 0.0 |

Example 4

Use of a 2-Phenylcarbamoyl-1-Naphthol Masking Coupler of this Invention in a Multilayer Film.

The multilayer film structures for this comparison are shown below. Gelatin was used as the binder in the various layers of these films. Dispersions of the various components were prepared and coated by methods known in the art. Component laydowns in g/sq m are listed in parentheses. In the coating diagram, single lines mark the boundaries between layers, and double lines differentiate between separate coating melts in the same layer that are mixed prior to coating.

Multilayer Film Structure for Example 4

Overcoat Layer Containing UV Absorbers and Cyan and Magenta Dyes
Fast Yellow Layer Containing Yellow Imaging Couplers, a Yellow DIAR Coupler, BARC G1 and Silver Halide Emulsions
Slow Yellow Layer Containing Yellow Imaging Couplers, a Yellow DIAR Coupler, BARC G1 and Silver Halide Emulsions
Interlayer Containing A Yellow Filter Dye
Fast Magenta Layer Containing a Magenta Imaging Coupler, Magenta and Yellow DIRs, a Magenta Masking Coupler and a Silver Halide Emulsion
Mid Magenta Layer Containing a Magenta Imaging Coupler, a Magenta Masking Coupler, a Cyan DIAR Coupler and a Silver Halide Emulsion
Slow Magenta Layer Containing a Magenta Imaging Coupler, a Magenta Masking Coupler and Silver Halide Emulsions
Gelatin Interlayer
Fast Cyan Layer Containing:

Imaging Coupler B1 (0.172) + S2(0.086)    BARC G1 (0.002) + S4 (0.002)
  DIR G2 (0.048) + S1 (0.194)   DIAR G3 (0.013) + S5 (0.026)
    Silver Halide Emulsion (1.076 g Ag/sq m)
    and Masking coupler E1 (0.048) Comparison or CP1/CO-1 (0.048) Invention
Mid Cyan Layer Containing:

Imaging Coupler B1 (0.226 + S2 (0.113)   BARC G1 (0.003) + S4 (0.003)
  DIR G2 (0.048) + S1 (0.194)   DIAR G3 (0.006) + S5 (0.012)
    Silver Halide Emulsion (0.699 g Ag/sq m)
    and Masking Coupler E1 (0.022) Comparison or CP1/CO-1 (0.022) Invention
Slow Cyan Layer Containing:

Imaging coupler B1 (0.538) + S2 (0.269)   BARC G1 (0.086) + S4 (0.086)
  Silver Halide Emulsion (0.355 g Ag/sq m)   Silver Halide Emulsion (0.301 g Ag/sq m)
    and masking Coupler E1 (0.027) Comparison or CP1/CO-1 (0.027) Invention
Antihalation Layer Containing Grey Silver and Cyan (H1), Magenta and Yellow Dyes (Same cyan dye as derived from Coupler G1)
Cellulose Acetate Support Structures of compounds included in the above multilayer film structure, and not previously disclosed, are as follows:

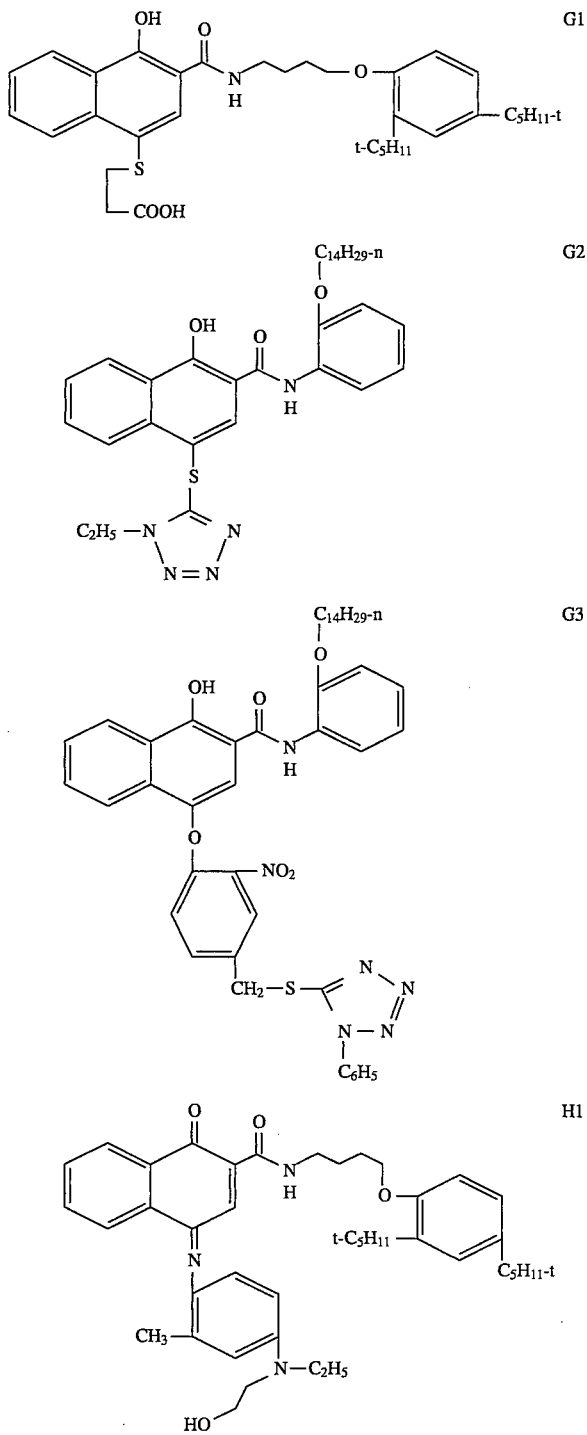

The films were processed and analyzed as in Example 1 above. In this Example the difference in status M red density for the films processed in seasoned Bleach B vs fresh Bleach II are of particular interest. Note in Table IV that the film containing masking coupler CP1/CO-1 of this invention yields significantly lower reductions in red density in the seasoned bleach at densities of both 1.0 and 1.8 (vs fresh Bleach II) relative to the film containing the comparison masking coupler E1.

TABLE IV

| Film | Masking Coupler | Dr (Bleach B) − Dr (Bleach II) at Dr = 1.0 | Dr (Bleach B) − Dr (Bleach II) at Dr = 1.8 |
| --- | --- | --- | --- |
| Comparison | E1 | −0.19 | −0.030 |
| Invention | CP1/CO-1 | −0.13 | −0.025 |

In the course of determining the couplers of the present invention, it was found that other types of novel two- (or four) equivalent 2-phenylcarbamoyl-1-naphthol image-modifying couplers also exhibit a resistance to leuco cyan dye formation and crystallization at low temperatures. These other image-modifying couplers, which are other than the couplers described above, include bleach accelerator releasing couplers (BARCs), and timed or untimed, switched or unswitched development inhibitor releasing couplers (DIAR and DIR couplers), preferably having the structure:

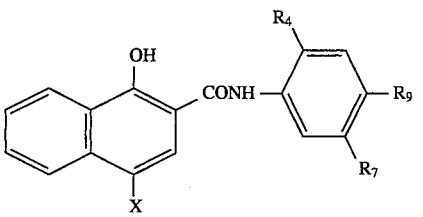

wherein:

$R_4$ is selected from an alkoxy group, a phenoxy group and halogen;

$R_7$ is selected from the group consisting of an alkyl group, a phenyl group, an alkoxy group, a halogen, and an alkoxycarbonyl group;

$R_9$ is selected from hydrogen, and an alkyl group;

$R_4$, $R_7$, and $R_9$ together contain at least 3 carbon atoms; and

X is a timed or untimed, development inhibitor group or bleach accelerator group. DIAR couplers, and DIR couplers, are combined with the novel two-equivalent 2-phenylcarbamoyl-1-naphthol couplers of the present invention, and incorporated into a photographic element. Preferably, the same four equivalent parent coupler is utilized as the basis for all the cyan dye forming DIR couplers, DIAR couplers, BARC's, and masking (and high dye yield) couplers.

This invention has been described in detail with particular reference to the preferred embodiments thereof, but it will be understood that variations and modifications can be effected within the spirit and scope of the invention.

What is claimed is:

1. A photographic element comprising a support bearing (a) at least one silver halide emulsion and (b) at least one cyan dye-forming 2-phenylcarbamoyl-1-naphthol coupler having the structure

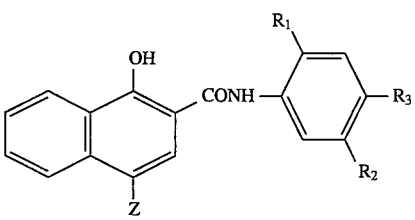

wherein:

$R_1$ is selected from the group consisting of an alkoxy group, a phenoxy group and halogen;

$R_2$ is selected from the group consisting of an alkyl group, a phenyl group, an alkoxy group, a halogen, and an alkoxycarbonyl group; with the provisoes that when $R_2$ is a halogen, $R_1$ is an alkoxy or phenoxy group, and when $R_2$ is an alkoxycarbonyl group, $R_1$ is a phenoxy group;

$R_3$ is selected from hydrogen, and an alkyl group;

$R_1$, $R_2$, and $R_3$ together contain at least 3 carbon atoms; and

Z is a coupling off group selected from the group consisting of a blocked dye moiety and a structure of the formula:

—A—B—N=N—D wherein:

A represents a divalent linking group which releases from the coupler upon reaction with oxidized developer to cleave Z from the remainder of the coupler;

B is a divalent aromatic group; and

D is an aryl or heteroaryl group.

2. A photographic element according to claim 1 wherein $R_1$, $R_2$, and $R_3$, together contain at least 9 carbon atoms.

3. A photographic element according to claim 2 wherein Z is a blocked dye moiety of the formula:

—L—E wherein:

L is a linking group; and

E is selected from the group consisting of an azo or azomethine dye.

4. A photographic element according to claim 3 wherein L selected from the group consisting of

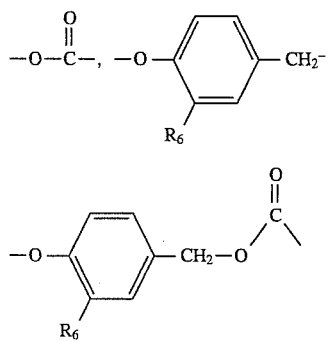

and
wherein:

$R_6$ is an electron withdrawing group.

5. A photographic element according to claim 1 wherein $R_2$ is selected from the group consisting of an alkyl group, a phenyl group, an alkoxy group, and a halogen; with the proviso that when $R_2$ is a halogen, $R_1$ is an alkoxy or a phenoxy group.

6. A photographic element according to claim 5 wherein $R_1$ is selected from the group consisting of an unbranched and unsubstituted alkoxy group, and a substituted alkoxy group having less than 6 carbon atoms.

7. A photographic element according to claim 5 wherein $R_2$ is an unbranched and unsubstituted alkoxy group.

8. A photographic element according to claim 1 wherein Z has the structure:

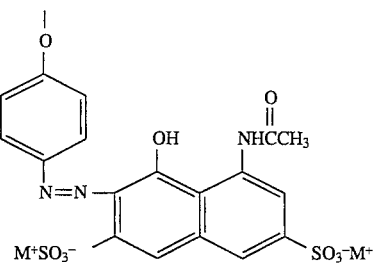

wherein M is selected from the group consisting of an alkali metal cation and a protonated amine cation.

9. A photographic element according to claim 8 wherein the alkali metal cation is selected from the group consisting of $K^+$, $Na^+$ or $Cs^+$.

10. A photographic element according to claim 9 wherein the protonated amine is selected from the group consisting of pyridinium, ammonium, triethylammonium and tributylammonium.

11. A photographic element according to claim 10 wherein the protonated amine is pyridinium.

12. A photographic element according to claim 1 wherein the coupler is selected from the group consisting of:

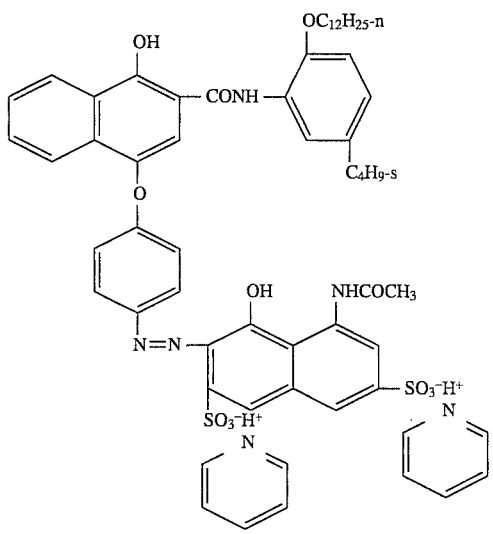

43
-continued
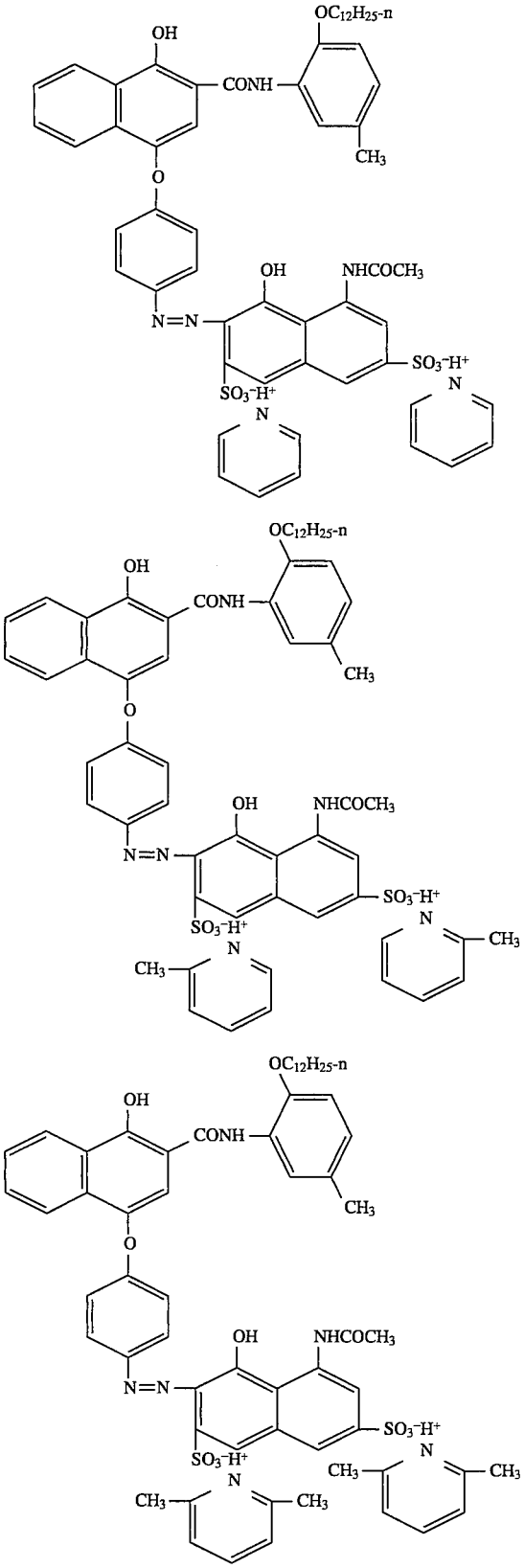
44
-continued
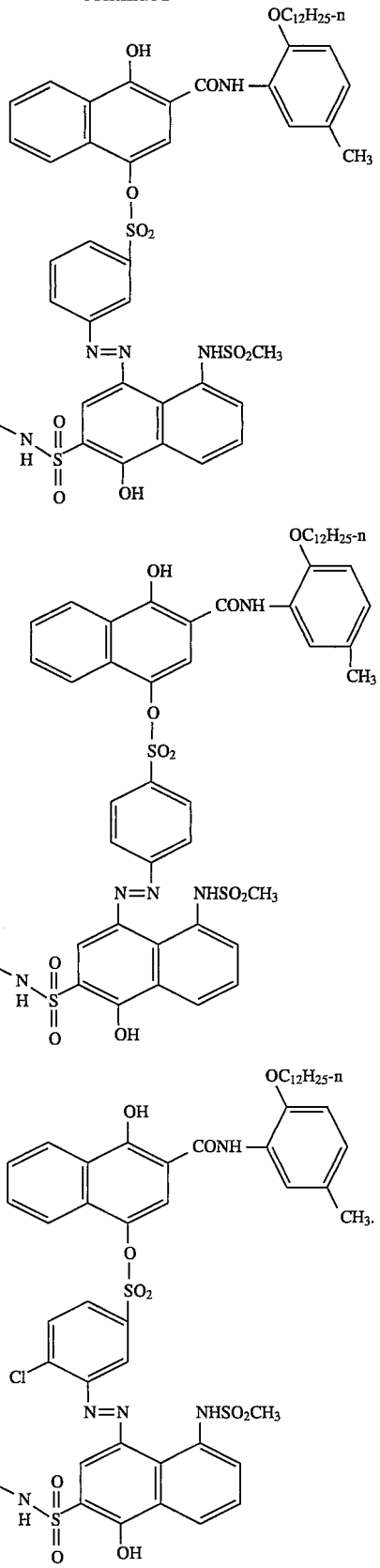

13. A photographic element according to claim 1 wherein A is a linking group selected from the group consisting of —OCH₂CH₂O—, —O—, —S—, —C(O)O—, —NHSO₂—, —OCH₂SO₂NH—, and —OCH₂CONH— groups.

14. A photographic element according to claim 13 wherein B is a phenylene group.

15. A photographic element according to claim 14 wherein D is a naphthyl group.

16. A photographic element according to claim 1 further comprising a cyan dye forming 2-phenylureido-5-carbonamidophenol imaging coupler.

17. A photographic element according to claim 1 wherein said coupler is in amounts between about 0.002 and about 0.40 grams per square meter silver.

18. A photographic element according to claim 17 wherein said coupler is in amounts between about 0.01 and about 0.20 grams per square meter silver.

19. A photographic element according to claim 1 further comprising a coupler having the structure:

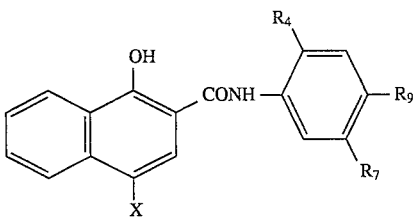

II wherein:

$R_4$ is selected from an alkoxy group, a phenoxy group and halogen;

$R_7$ is selected from the group consisting of an alkyl group, a phenyl group, an alkoxy group, a halogen, and an alkoxycarbonyl group;

$R_9$ is selected from hydrogen, and an alkyl group;

$R_4$, $R_7$, and $R_9$ together contain at least 3 carbon atoms; and

X is a timed or untimed, development inhibitor group or bleach accelerator group.

* * * * *

UNITED STATES PATENT AND TRADEMARK OFFICE
CERTIFICATE OF CORRECTION

PATENT NO. : 5,510,235

DATED : April 23, 1996

INVENTOR(S) : Paul B. Merkel

It is certified that error appears in the above-indentified patent and that said Letters Patent is hereby corrected as shown below:

Title page, item [54] and col. 1, line 2, Title : should read
-- PHOTOGRAPHIC ELEMENTS COMPRISING 2-PHENYLCARBAMOYL-1-NAPHTHOL IMAGE-MODIFYING COUPLERS YIELDING DYES RESISTANT TO CRYSTALLIZATION AND REDUCTION--.

Signed and Sealed this

Thirtieth Day of July, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,510,235

DATED : April 23, 1996

INVENTOR(S) : Paul B. Merkel et al.

It is certified that error appears in the above-identified patent and that said Letters Patent is hereby corrected as shown below:

On the title page, item [75] Inventors: should read

Paul B. Merkel; Jerrold N. Poslusny;
      Daniel L. Kapp; Robert J. Ross, all of
      Rochester, N.Y.

Signed and Sealed this

Third Day of December, 1996

Attest:

BRUCE LEHMAN

*Attesting Officer*      *Commissioner of Patents and Trademarks*